(12) United States Patent
Olshausen

(10) Patent No.: US 6,587,198 B2
(45) Date of Patent: Jul. 1, 2003

(54) COMPACT, SOLAR SPECTROMETER WITH SUB-ONE-THIRD ANGSTROM RESOLUTION, FAINT-LIGHT COMPENSATION, AND INFRARED AND ULTRAVIOLET SUPPRESSION

(76) Inventor: Michael Cohnitz Olshausen, 1280 21$^{st}$ St., NW., Unit 503, Washington, DC (US) 20036

( * ) Notice: Subject to any disclaimer, the term of this patent is extended or adjusted under 35 U.S.C. 154(b) by 126 days.

(21) Appl. No.: 09/796,656

(22) Filed: Mar. 2, 2001

(65) Prior Publication Data

US 2002/0126278 A1 Sep. 12, 2002

(51) Int. Cl.$^7$ .................................................. G01J 3/28
(52) U.S. Cl. ........................................................ 356/328
(58) Field of Search ................................. 356/326, 328, 356/319

(56) References Cited

U.S. PATENT DOCUMENTS 4,678,332 A * 7/1987 Rock et al. ............... 250/338.5
6,151,112 A * 11/2000 Atkinson et al. ........... 356/328

* cited by examiner

Primary Examiner—Zandra V. Smith

(57) ABSTRACT

A compact, grating spectrometer (1A) particularly adapted for visual observation of the sun's spectrum, from the Calcium K line to the Fraunhofer B line, at very high dispersion. The numerical aperture of the spectrometer's collimating mirror is intentionally mismatched to the numerical aperture of the spectrometer's light-input device in order to exploit, by means of the exceedingly narrow width of the spectrometer's entrance slit (110), the high degree of coherence of the central region of the Airy disk formed by the light-input device. The resulting Fraunhofer diffraction illuminates totally, or nearly totally, the collimating mirror throughout the K–B interval. The human eye's dynamic range is compensated to maintain resolution at the lowest, light levels of the K–B interval. UV spill is suppressed. Both input-optics and slit are shielded against differential heating.

22 Claims, 13 Drawing Sheets

Fig. 11
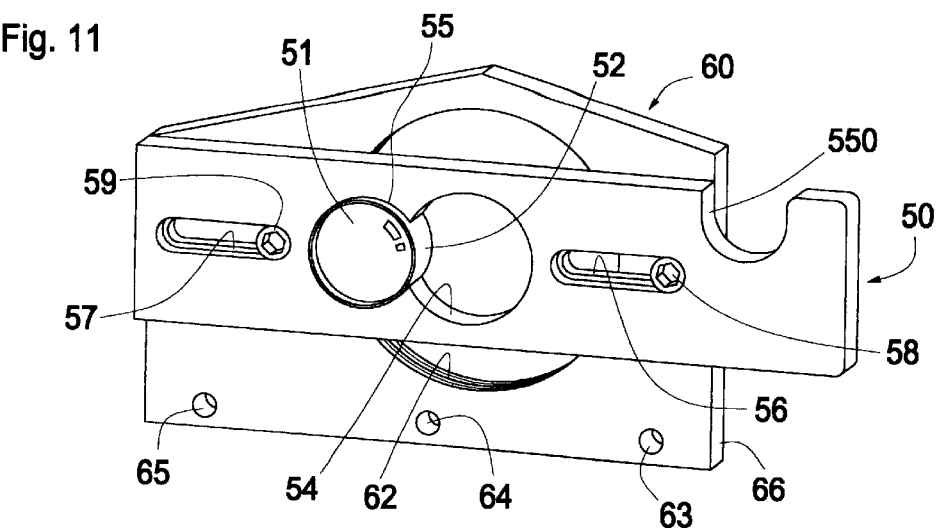
Fig. 12
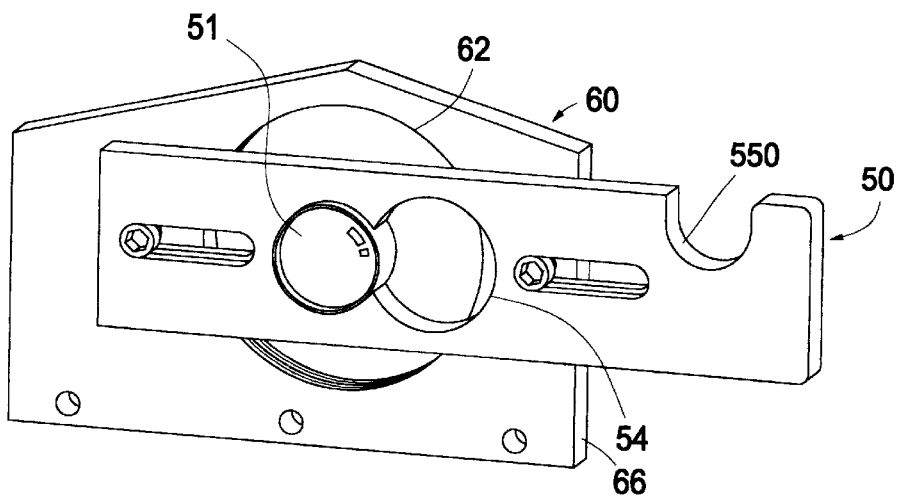
Fig. 13
$$p \equiv F_1 - \Delta = F_2(\sqrt{\gamma} - 1)$$
Fig. 14
$$\epsilon = F_2 \frac{(\sqrt{\gamma} - 1)}{\sqrt{\gamma}}$$

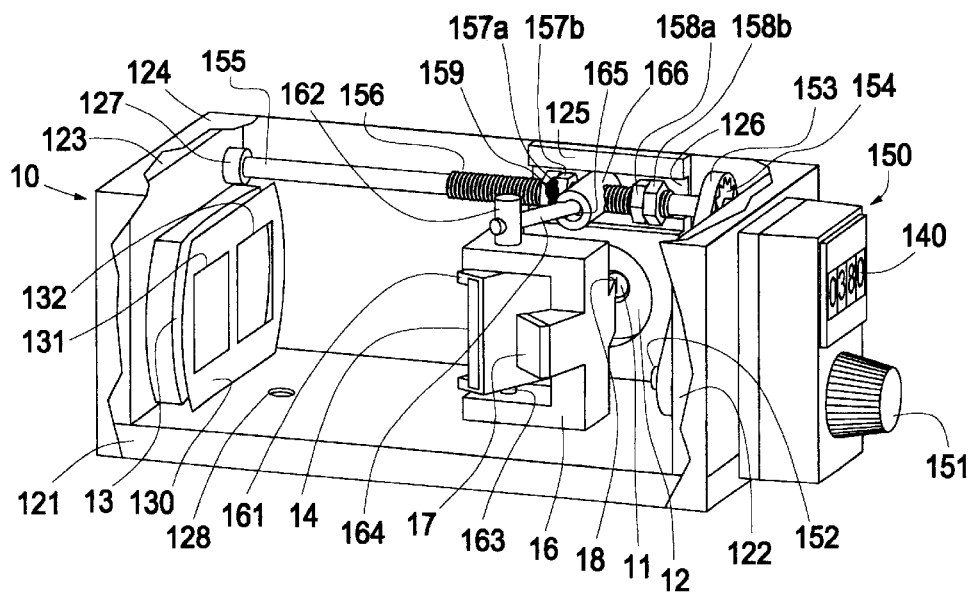
Fig. 17
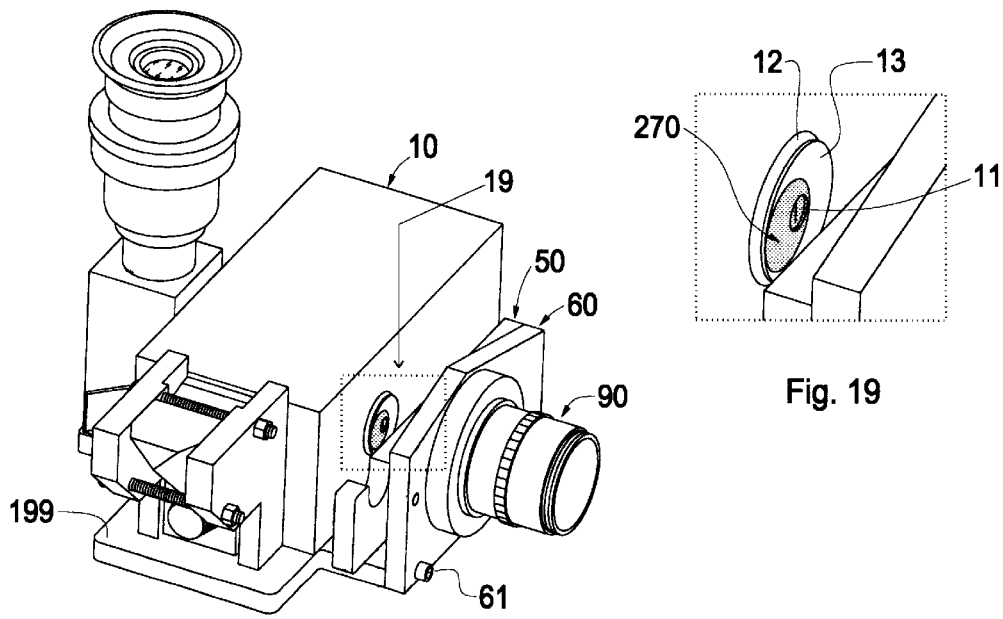
Fig. 18
Fig. 19

COMPACT, SOLAR SPECTROMETER WITH SUB-ONE-THIRD ANGSTROM RESOLUTION, FAINT-LIGHT COMPENSATION, AND INFRARED AND ULTRAVIOLET SUPPRESSION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Grating spectrometers broadly define the optical art to which the present invention relates, particularly compact spectrometers adapted for examining visually the spectrum of the sun. High dispersion, that is, the ability of a spectrometer to show closely-spaced detail as separate, is only advantageous visually if the image of the spectrum conveyed to the eye is bright enough for the eye to perceive the detail. Sunlight can be so highly dispersed and, subsequently, magnified that it appears faint, the fine detail murky. The present invention extends the eye's dynamic range by ensuring that high, spectral resolution remains matched to good, apparent contrast beyond the usual limits of the dynamic range.

The sun's visible spectrum may be roughly differentiated into the spectrum of the photosphere and the spectra, quite different, of sunspots. This difference may, in principle, be seen whenever the image of a sunspot is projected onto the entrance slit of a high-dispersion spectrometer, provided only that the sunspot is wider than the slit. It is best seen, however, when the image of the sunspot is made as large as possible relative to the entrance slit's length, provided only that good contrast is maintained.

In sum, then, visually to exploit high dispersion, as well as to distinguish sunspot spectra, the spectrometer's light-input device must, of necessity, be a telescope. Telescopic means for intensifying and imaging light, however, particularly if movably mounted and modestly sized, do not couple easily to laboratory, bench spectrometers, which may weigh several kilograms. The present invention, by comparison, is light in weight and very small. Nonetheless, it discloses detail of haunting subtlety throughout the visual range. Its resolution closely approaches the practical limit of its diffracting grating. Solar absorption lines having peaks spaced apart by ≈0.31 Å (0.031 nm) are easily split. For a spectrometer that fits comfortably into the palm of a hand, that is rather good.

The perception of faint, solar absorption lines is significantly enhanced by the elimination of glare, that is, by avoiding halation of the retina. If brightness is optimized for those wavelengths at which the eye is most sensitive, then the eye's light-adaptive ability will automatically compensate for reduced brightness throughout the remainder of the eye's nearly 260 nm, dynamic range. Shown in FIG. 1 (see Warren J. Smith, *Modern Optical Engineering*, © 1990 McGraw Hill), the human eye's photopic (color) sensitivity peaks somewhere between 550 nm and 560 nm, before falling off precipitously below about 435 nm and above about 695 nm (where sensitivity drops to approximately 1% of peak sensitivity), depending on the individual. These "fall-off" wavelengths, however, are significant for a solar-related reason, too: they are where many of the most important features of the sun's spectrum, "must-see" items on any first, educational tour, are to be found. The broadest of all the solar, absorption lines, the resonance, K, line of singly ionized calcium (CaII), lies at 393.4 nm, followed closely by the H line of CaII at 396.8 nm. The most important solar line of all, certainly historically, is H-alpha, written Hα, the first line in the Balmer series of hydrogen, at 656.3 nm. Redward of Hα are the stunning, telluric lines of $O_2$. Their band head, Fraunhofer's B line, lies at 686.7 nm.

The human eye's greatly diminished sensitivity below 400 nm must be compensated, if the H and K lines are to be observed distinctly. If brightness has already been adjusted so that the continuum is free of glare at 560 nm, then below 410 nm the continuum will simply have become too faint for the human visual system dynamically to compensate contrast on its own. Depending on the time of day (i.e. on solar altitude) and on the humidity (terrestrial water vapor absorption), the H and K lines may either not be seen at all, or they may appear as black phantoms against an only-very-faintly luminous, deep-violet background. Typically, to compensate, a spectrometer's slit will be widened, that is, a tradeoff is made for increased brightness at the expense of diminished resolution. However, a ten-fold increase in perceived intensity requires a roughly ten-fold increase in slit width, and with this widening many fine lines and features near, between, and in the H and K lines are lost to view. The lines' extraordinary, natural broadening appears narrower than it actually is, as the lines' albatross-wide, feather-fine wings get merged evermore coarsely into the expediently-brightened continuum. Then, too, the necessary, adjustable slit, will be expensive, especially if it is to be capable of reliably repeating widths <10μ (1 micron=$10^{-6}$ m≈0.00004") while maintaining slit-jaw parallelism.

The present invention eliminates all of these disadvantages.

The present invention, especially in its exemplary embodiment, combines high-resolution with low-cost, small size, and low weight, and in such a manner that any notable improvement in contrast and/or in resolution will require a disproportionate increase in expense and/or in bulk. The present invention's single, spherical mirror could, for example, be replaced by independently mounted, but far-more costly, toroidal mirrors. The present invention is thus intended to satisfy an unmet, instrumental need among educators, and to supply an IR/UV-shielded, solar spectrometer to the high-end, amateur, astronomical community.

BRIEF SUMMARY OF THE INVENTION

Small, grating monochromators, off-the-shelf units built, for example, by Acton Research or Optometrics, usually are rather fast, commonly ≦f/4, which allows them to accommodate, with appropriate, internal baffling, light input from fiber-optic light guides, which ordinarily have high, numerical apertures (0.2 to 0.5) as well as fiber diameters of around 200 microns. U.S. Pat. No. 5,231,461 to Silvergate et al. (1993) shows a collimating mirror illuminated by sunlight input through a fiber-optic "slit".

Numerical aperture, we recall, for an imaging mirror or conventional lens is just one half the reciprocal of its paraxial focal length. Results discussed below first in terms of f/ratio will frequently be converted for ease of reference into the equivalent, numerical-aperture (n.a.) formulation.

In contrast to the typical, small monochromator, a telescope will usually have an f/ratio substantially higher than f/4, say f/8. Such a telescope, if used as the light-input device for an f/4 monochromator, will not illuminate fully the monochromator's grating, that is, the telescope's ray cone will be excessively narrow, and so the telescope will fail fully to exploit the grating's resolution.

In the solar case, where the desire is understandably great to project onto the spectrometer's entrance slit as large an image of the sun as possible, in order better to isolate sunspot spectra, the apparent mismatch of high-f/ratio telescope as small-monochromator, light-input device is only aggravated. The larger the desired solar image, the greater must be the telescope's effective focal length. Given the high cost of large-diameter optics, the greater the effective focal length, the higher will be, as a practical matter, the f/ratio.

A monochromator, we note, can easily be turned into a visual spectrometer by first removing the exit-slit and by then installing magnifying optics with which to view the imaged spectrum, normally hidden behind the exit-slit assembly. The one, obvious exception, of course, is the true Littrow mount.

There is yet another reason, why, for a high-dispersion spectrometer in which the image of the spectrum is magnified for viewing, i.e. in which the input light is very-greatly spread out, a high f/ratio for the telescopic, light-input device is unavoidable. Briefly stated, the maintenance of optimum visual contrast, once it has been empirically determined, depends, essentially linearly, on focal ratio.

Using the present invention's exemplary embodiment as a test bed, experiment demonstrated that visual contrast was optimized at 550 nm when a solar image 6.8 mm in diameter was focused onto the spectrometer's entrance slit by an objective having an entrance pupil 37.2 mm in diameter. For a fixed slit width, this optimum contrast will be maintained for any, entrance-pupil diameter by holding constant the ratio of entrance pupil area to solar image area, i.e. by holding constant the amplification of light intensity.

The diameter, D, of the solar image depends on focal length alone, and also linearly, equaling 9.42 mm for each meter of focal length, (1.13 inches for each 10 ft), seasonally averaged, so that, for a focal length F, $D=9.42\times10^{-3}F$. Holding constant the ratio of entrance pupil area to solar image area, i.e. maintaining optimum visual contrast, therefore requires, for a telescope of aperture D used on axis and having a central obstruction of diameter d, that $$[6.8/37.2]^2 = \emptyset\{[(9.42\times10^{-3}F)/2]^2\}/\Pi[(D/2)^2-(d/2)^2], \quad (1)$$

or $$6.8/37.2 = [9.42\times10^{-3}F/D][1/(1-d^2/D^2)^{1/2}]. \quad (2)$$

Assuming that $d \leq D/2$, we have $$(6.8/37.2)(0.75)^{1/2} \leq 9.42\times10^{-3}(F/D)_{optimum} \leq 6.8/37.2, \quad (3)$$

or $$f/16.8 \leq (F/D)_{optimum} \leq f/19.4, \quad (4)$$

which, in terms of numerical aperture, is $$0.0298 \geq n.a._{optimum} \geq 0.0258.$$

Individuals, of course, will vary somewhat in their estimate of optimum contrast, depending particularly on their age and health, so that the results in (4) may vary perhaps by plus-minus 20%. The larger point is that optimum, visual contrast for a high-dispersion, grating, solar spectrometer will always come at a telescopic, light-input f/ratio that is substantially greater, meaning by a factor of around four, than the f/ratio of the typical, small, commercial monochromator.

The amplification of light intensity that produced the optimal visual contrast, ignoring some relatively minor losses due to filtering, was just the ratio of entrance-pupil area to solar-image area, namely $(37.2/6.8)^2$, or about 30 to 1.

Image intensity, all other system parameters remaining unchanged, is roughly proportional to slit width. The f/19.4 focal ratio that delivered the optimum contrast for the exemplary embodiment of the present invention did so for a $5\mu$ slit. For a $4\mu$ slit, the optimum ratio drops to f/15.5. For a $3\mu$ slit it is f/11.6. For a $2\mu$ slit it is f/7.8. All of these f/ratios are substantially greater than f/4, the typical, small, commercial monochromator (turned spectrometer) f/ratio.

The present invention takes the apparent, f/ratio-mismatch of small, visual, grating spectrometer to telescopic, light-input device and turns it to advantage, by recognizing that, for a very intense light source, such as the sun, the fast, spectrometer f/ratio can be exploited. If an ultra-narrow slit is installed, and provided that the telescope's f/ratio is sufficiently high, Fraunhofer diffraction (preview FIG. 5) will broaden the light re-radiated at the slit (in accordance with Huygen's principle) into a cylindrical wavefront that can be made closely to match the spectrometer's f/ratio, with very little loss of light intensity. The present invention's exemplary embodiment employs a $5\mu$ (=0.00019"), laser-cut, fixed slit and an f/19.4 telescopic light-input device. Laser-cut slits down to $4\mu$ are commercially available, and $2\mu$ slits (1.1 mm long) have been manufactured, though they are more expensive.

The seeming, f/ratio-mismatch is furthermore actually necessary if an ultra-narrow slit is effectively to be used at all in a compact, high-dispersion, visual, solar spectrometer. The focal length of a small spectrometer is typically only a few inches. In the exemplary embodiment, it is just 74 mm. At a distance of 74 mm a $5\mu$ slit subtends an angle of just 13.9 arc-seconds:

$$13.9 arcsec = 2\tan^{-1}\{[(5\times10^{-6})/2]/(74\times10^{-3})\}\times3600, \quad (5)$$

where the $\tan^{-1}$ function is here understood to return degrees, rather than radians. If such a compact spectrometer were to have an f/ratio matched to the f/ratio of the typical, high-end, commercial, refracting telescope used as a light-input device, say f/8, then the spectrometer's 74 mm focal-length, collimating mirror would have a diameter of only 9.25 mm (=74 mm/8). The well-known, Rayleigh criterion for the minimum, angular resolution for a circular aperture, $\theta_{min}$, is just $$\theta_{min} 32\ 1.220\lambda/D \text{ radians.} \quad (6)$$

In arc-seconds, for $\lambda=550$ nm, this is the familiar 5.45"/D, where D is in inches. The resolution of a matched, f/8, 9.25 mm diameter aperture will thus just be 14.9 arc-seconds, but that is too little to resolve a $5\mu$ slit.

The f/3.9 collimating mirror in the exemplary embodiment of the present invention (f/3.9 is equivalent to a numerical aperture of 0.128) has a diameter of 19 mm (=74 mm/3.9) and thus a resolution of 7.3 arc-seconds at $\lambda=550$ nm. The choice of a compact spectrometer that is also fast as the core component of the present invention thus assures that the instrument's collimating mirror will have more than sufficient resolution to distinctly image an ultra-narrow slit at all visual wavelengths.

This consideration is still more important for the spectrometer's second, image-forming mirror, because, at long wavelengths, it will be only partly illuminated by diffracted rays sent to it from the tilted grating (preview FIG. 6). The Rayleigh criterion for the angular resolution of a grating can be written as $$(\Delta\theta)_{min}=[\lambda/(Na\ \delta\ \cos\beta)]\{[(360)(3600)]/2\Pi\}\ \text{arc-seconds}, \quad (7)$$

where β is the angle of diffraction for the wavelength λ, Na is the grating width (total number of rulings, N, times the width, a, of each), and δ is the proportion of the grating actually illuminated (see e.g. *Optics*, by Eugene Hecht, Addison-Wesley, 1990. P.428). For the exemplary embodiment of the present invention at Hα, λ=656.3 nm, β=66.5° (preview FIG. 6), Na=20 cm and is fully illuminated, with the result that $(\Delta\theta)_{min}$=17.0 arc-seconds. The imaging mirror, however, solely due to the spectrometer's geometry, is only 42% illuminated at Hα. Thus the resolution of the imaging mirror will be less than a full 7.3 arc-seconds, will in fact be only 20.7 arc-seconds [=(7.3/0.42)(656/550)].

At the K line, λ=393.0 nm, β=41.2°, Na=20 cm and is ≈81% illuminated (preview FIG. 7), with the result that $(\Delta\theta)_{min}$=6.5 arc-seconds. The imaging mirror, due this time to partial illumination of the grating, is 65% illuminated; its resolution is 8.0 arc-seconds [=(7.3/0.65)(393/550)].

In other words, with a 5μ slit, the imaging mirror of the exemplary embodiment is just slightly below the lower limit of size necessary to reproduce the angular separation of wavelengths achieved by the spectrometer's grating. Only in a short-focus spectrometer that is also fast will both mirrors be sufficiently large, or very nearly so, to exploit fully even a relatively small grating.

The present invention employs a 2400 line/mm grating, which is also very near to the practical, upper limit of grating, line density for the first-order, visual spectrum. The grating equation may be written as $$m\lambda/a=2\cos[(\alpha-\beta)/2]\sin[(\alpha+\beta)/2], \quad (8)$$

where α, the angle of incidence, and β, the angle of diffraction, are positive when measured counter-clockwise from the grating normal, m is the order number, and a, as before, is the width of a grating ruling (see the *Diffraction Grating Handbook*, Richardson Grating Laboratory, at http://www.gratinglab.com. Note that care must always be taken to understand which angle-measurement convention is being used by a particular reference! The grating equation given by Hecht in *Optics* differs by a sign from this "same", standard equation given by the Richardson *Handbook!*). Since both the sine and cosine must be ≦1, this may be re-written, entirely independently of spectrometer geometry, as $$(1/a)\leq(2/m\lambda). \quad (9)$$

For λ=700 nm, (1/a) must therefore be ≦2857 lines/mm in the first-order visual. Among commercially available gratings, a 2400 line/mm grating therefore represents a practical limit on grating line density for first-order, visual observation. The first-order spectrum, furthermore, is the order of choice for visual observation of the solar spectrum because its free spectral range is the greatest of any order, independent of grating.

The present invention employs, preferentially, an Ebert, single-mirror, plane-grating mount, for its significant advantages of compactness and low cost relative to two-mirror mounts, such as the Czerny-Turner. A single-mirror, Littrow mount might be used instead, however it requires an entrance slit lying in nearly the same plane as, and very close to, the imaged spectrum (Richardson *Grating Handbook*, op. cit.). The Littrow geometry reduces greatly the space available for easily inserting optics with which to view the imaged spectrum, which in turn limits an observer's ability to project a full-disk image of the sun onto the entrance-slit and slit housing, making more difficult the orientation of the slit with respect to the sun's disk. The Littrow is furthermore prone to scattered light in the imaged spectrum, particularly if the light's source is intense.

A plane grating illuminated by a straight entrance slit produces curved spectral lines. This well-known phenomenon does not, however, in itself diminish resolution. As William G. Fastie noted in *A Small Plane Grating Monochromator*, J. Opt. Soc. Am. 42, 641 (1952), long, curved slits do increase throughput but do not increase practical resolution: "the resolving power for any short portion of the slit was the same as for any other short portion . . ." The most effective, practical contributor to poor, visual resolution is in fact oil inadvertently smudged from eyelashes onto the ocular.

The present invention's exemplary embodiment employs a straight, 3 mm long, entrance slit, of which only the middle 2.4 mm actually contribute to the visual field (preview FIG. 16).

Fastie, in *Image Forming Properties of the Ebert Monochromator*, J. Opt. Soc. Am. 42, 648 (1952)), derived an approximate formula for the maximum length L of a straight slit capable of yielding resolution indistinguishable from theoretical resolution at a wavelength λ for a mirror of focal ratio f in an Ebert mount, and despite the Ebert's well-known astigmatism:

$$L=10\lambda f^3. \quad (10)$$

For the exemplary embodiment's f/3.9 collimating mirror and for λ=560 nm, L=0.33 mm. This "short portion" is about the width of a large sunspot projected onto the slit.

Fastie measured a line separation of 0.05 Å in the second-order, visible spectrum using a 3" grating having 30,480 lines/inch, in an Ebert mount with a 762 mm focal-length mirror and a straight, 2 mm, entrance slit (see Fastie, Abstract to *Small Monochromator*, op. cit.). The exemplary embodiment of the present invention uses a 20 mm square, holographic grating with 2400 lines/mm, blazed in the visual. Minimum perceptible line separation being inversely proportional both to the total number of illuminated, grating rulings and to the order number, the corresponding, visual resolution for the present invention should be about:

$$0.19\ \text{Å}=0.05\ \text{Å}\times(91440/48000)\times(2/1). \quad (11)$$

This agrees closely with observation. The strong, solar, iron multiplet at 4957.5 Å, shown in FIG. 4, has peaks 0.31 Å apart with a Rayleigh-criterion-like overlap. The peaks are easily split by the present invention, despite the grating's not-quite-full illumination at that wavelength. Such resolution is fine-enough to allow delicate distinctions to be readily made, such as between the typical, Gaussian profile of most, solar spectral lines and the "triangular form" resulting from natural line broadening, as seen in the optically-deep, Magnesium line at 5172.6 Å, shown in FIG. 3.

Magnification of the imaged spectrum is accomplished in the present invention somewhat as it is in a prism spectrometer, except that the telescope objective has been replaced by an optical relay, preferably 1:2, followed by the usual, short-focal length eyepiece (here 8 mm). The spectrum is thus magnified approximately 64 times (64=2×32, where 32≈10×25.4 mm/8 mm; the closest approach of a human eye to an object usually being considered to be 10 inches). The relay also creates a second focal plane, which facilitates the installation of a movable indicator. The preferred indicator in the present invention is superficially similar to the slide for uranium glass shown in FIG. 11 of U.S. Pat. No. 1,746,083 to Kurtz (1930), but functions entirely differently. Kurtz's slide, even with its uranium glass removed, would not yet be adapted for use in the present invention.

The telescope (a Questar Maksutov) used to form the sun's image on the entrance slit of the present invention has focal-length of 1210 mm at the slit and forms a solar image 11.4 mm across. This is about four times the length of the 3 mm slit used in the present invention. Thus, the slit can be swept across the sun's image in bands that are not overly wide relative to a large sunspot group. A $5\mu$ slit, incidently, corresponds to ≈0.8 arc-seconds on an 11.4 mm solar disk, or to about one half the width of a solar granule, under excellent seeing conditions.

Sunspot groups with magnetic fields >3500 gauss, i.e. generally having areas >1500 millionths of the solar disk, appear about eight to ten times during an 11-year solar cycle. The iron lines at 6173.3 Å and 6302.5 Å and the vanadium line at 6258.6 Å are particularly susceptible to Zeeman splitting (see Bray and Loughhead, *Sunspots,* Dover, 1964). When such a large sunspot group is viewed near the center of the solar disk, so that its umbral, magnetic field lines lie parallel to the line of sight, each of these sensitive lines will be split into two, oppositely-polarized components, separated by 0.32 Å, 0.32 Å and 0.42 Å, respectively. The present invention is entirely capable of revealing Zeeman splitting of this large, albeit quite uncommon, magnitude.

The exemplary embodiment's $5\mu$ entrance-slit is cut by laser into a thin disk of stainless steel. The disk is then sandwiched between much-thicker mounting plates, and the entire assembly is mounted onto the spectrometer. To insure optimum resolution, the slit must remain parallel to the grating rulings. Strong, differential heating of the slit assembly will exert uneven stresses on the slit, warping it, possibly permanently after repeated use, and is thus to be avoided. The telescope forming the sun's image on the slit will typically be stopped down, as well, thus differential heating of its elements is also to be avoided. Furthermore it is prudent practice always to enforce the rule among non-astronomers never to point a telescope at the sun without the proper filters. For these several reasons, when using the present invention the telescope's entrance pupil must always be fully covered by a heat absorbing, infra-red filter. The filter in the Schott Glass KG-1 to KG-5 heat-absorbing series that is most absorptive is the KG-5, and so it is the filter of choice. FIG. 1 shows the sun's irradiance multiplied by grating efficiency, where Littrow efficiency has been chosen as a benchmark. Below this curve is the same data but now showing the effect of the KG-5 filter out into the long, visible red. Light intensity at 700 nm is reduced by almost ⅔ (note the log scale)

At the violet end of the visual range, where light amplification becomes necessary for viewing the H and K lines, the present invention amplifies without sacrificing resolution. To accomplish this goal, a movable condenser is interposed into the beam converging from the telescope's objective, decreasing the telescope's effective focal length.

This condenser may also be used, of course, in the far, visible red, where light intensity has been reduced by the KG-5 filter. However, if the condenser is used at the far, red end, then it will also amplify the small amount of far-ultraviolet radiation overlapping the first-order spectrum from the second order. This overlap is very ignored, because the second-order, UV-spill is quite weak. Here, however, the condenser amplifies the UV-spill by a factor of about ten, depending on condenser focal length.

That there is any UV-spill results from the free spectral range of a diffraction grating interacting, so to speak, with the earth's atmospheric transmittance. Below 290 nm the atmosphere fully extinguishes solar, UV irradiance. Below 320 nm the fall-off in UV irradiance is very steep (for data see the Web site of New Zealand's National Institute of Water and Atmospheric Research at http://katipo.niwa.cri.nz/lauder/uvinfo.htm). Above 320 nm plenty of UV radiation reaches the ground. As for the eye itself, "the cornea transmits radiation from approximately 310 nm . . . to 2500 nm," and the lens "absorbs much of the light between 300 and 400 nm . . . the absorption maxima of the lens are 370 and 280 nm" (*Physiology of the Eye,* by William M. Hart, Jr., M. D., Ph.D., Mosby Year Book, 1992). Thus it becomes prudent to place a long-pass filter in the optical train. With a condenser amplifying ≦10×, both the Schott GG-385 and the Corion LG-370 filters will work well. The GG-385 filter, as shown in FIG. 1, produces a steep fall-off in throughput below 400. FIG. 2 shows the effect of the GG-385 on the second-order, UV overlap. Subsequent to amplification by the condenser, the UV-spill is reduced in intensity by the GG-385 filter by a factor of ≈0.0001 below the normal level encountered in an ordinary spectrometer used to view the sun's spectrum. The optical adhesives, furthermore, that are used to cement lenses and that usually are present in an eyepiece, will absorb the UV-spill still further.

Placing a lens, or lenses, close to the entrance slit of a spectrometer is not per se unusual. Lenses close to slits are found in U.S. Pat. No. 2,630,736 to Beitz (1953) and in U.S. Pat. No. 3,563,659 to Thompson (1971). However, the lenses in both these patents are the only lenses that are used to form the image of the light source. Beitz employs a standard, twin lens condenser set (FIG. 1 and col. 3, lines 9–11), while Thompson uses a microscope objective (col. 2, lines 43–45). In the present invention, by contrast, a first real image is formed by a telescope, and then a second real image is formed by the condenser, which uses the first real image as its virtual object.

Cylindrical lenses have quite commonly been placed in front of slits on spectrometers attached to telescopes, typically to broaden stellar spectra. Already in use in the mid-19th century, the technique is described by Schellen in *Spectrum Analysis,* the sumptuous, 1872 English edition of his German book. Schellen writes (pp. 269–270) "Merz, the celebrated optician of Munich, constructs direct-vision spectroscopes of great dispersive power . . . FIG. 138 shows the interior construction of such a spectroscope . . . L is a cylindrical lens employed for stellar observations , but withdrawn for observations on the sun." The idea of amplifying still further sunlight already focused onto a spectrometer's entrance slit in order to compensate for fall-off in the eye's dynamic range appears to be unusual.

It is thus a primary object of the present invention to provide a highly-compact, grating spectrometer that nonetheless achieves sub-one-third Angstrom resolution for light input at a high focal ratio, thereby allowing significant resolution of spatial detail in the light source to be combined with high wavelength resolution of the emitted light.

It is a further object of the present invention to provide a grating spectrometer having a means for compensating the eye's dynamic range without sacrificing wavelength resolution.

It is yet a further object of the present invention to provide a visual, solar, grating spectrometer with a first-order, free spectral range that is extended by suppressing second-order UV-spill.

These and still further objects and advantages of the present invention will become apparent from a consideration of the following, detailed specification, drawings, and appended claims.

BRIEF DESCRIPTION OF THE SEVERAL VIEWS OF THE DRAWING

Referring to the drawings, wherein like reference characters indicate like parts or elements throughout the several views, and wherein arrowheads indicate physically-composite objects whose numbered resolution into constituent parts occurs only when it is germane to the discussion:

FIG. 11 is a perspective view of two numbered elements of FIG. 8 rotated 45 degrees counterclockwise with respect to the vertical axis of FIG. 8.

FIG. 12 is identical to FIG. 11 except that, of the same two, numbered elements from FIG. 8, one of them has been translated to the right.

FIG. 13 is a formula.

FIG. 14 is a formula.

FIG. 17 is a perspective, partial break-away view of two of the numbered elements of FIG. 8 rotated counterclockwise 45 degrees with respect to the vertical axis of FIG. 8.

FIG. 18 is a perspective view of the elements of the invention shown in FIG. 9, but rotated clockwise 70 degrees about the vertical axis of FIG. 8 and then tipped downward 20 degrees.

FIG. 19 is an enlarged view of a portion of FIG. 18.

DETAILED DESCRIPTION OF THE INVENTION

Figure 1:
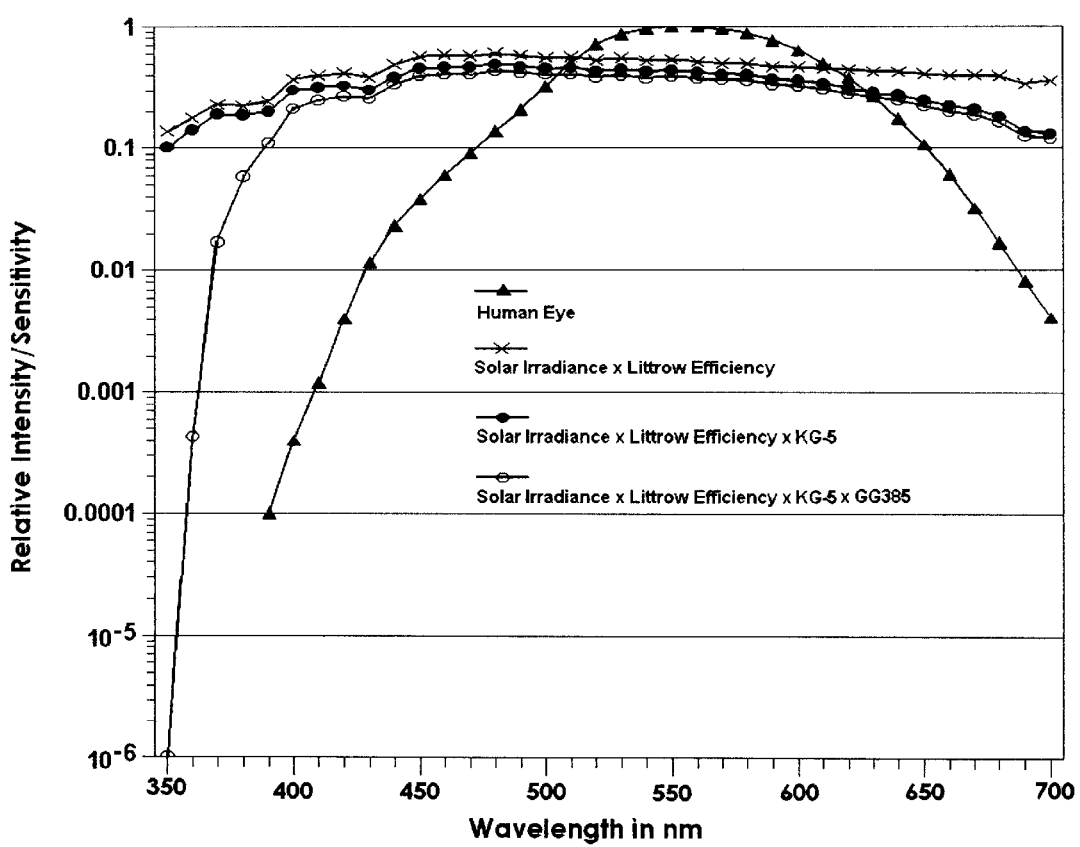
FIG. 1 is an annotated graph with a logarithmic ordinate

FIG. 1 has been described, above.

Figure 2:
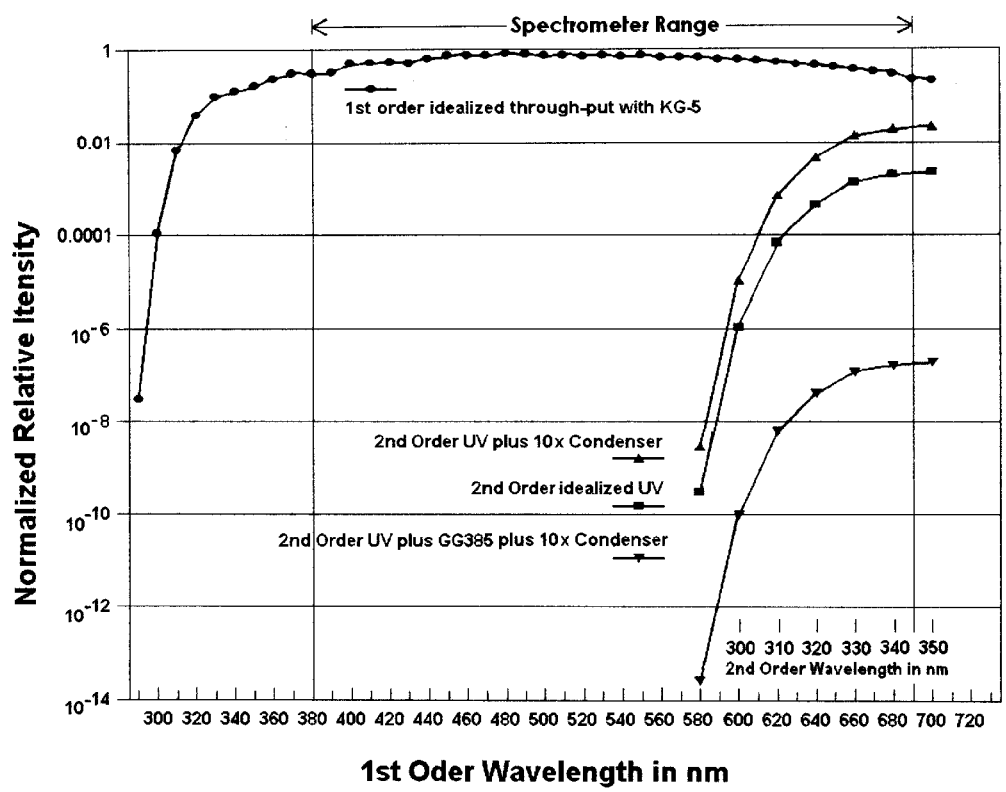
FIG. 2 is an annotated graph with a logarithmic ordinate

In FIG. 2, described above as well, note that the ordinate has been normalized for an "ideal", i.e. true Littrow, spectrometer. Note, too, the "stretched" wavelength scale of the second-order spectrum, the vertical lines demarcating the present spectrometer's range, and the huge, fourteen-order-of-magnitude, intensity variation along the ordinate.

Figure 3:
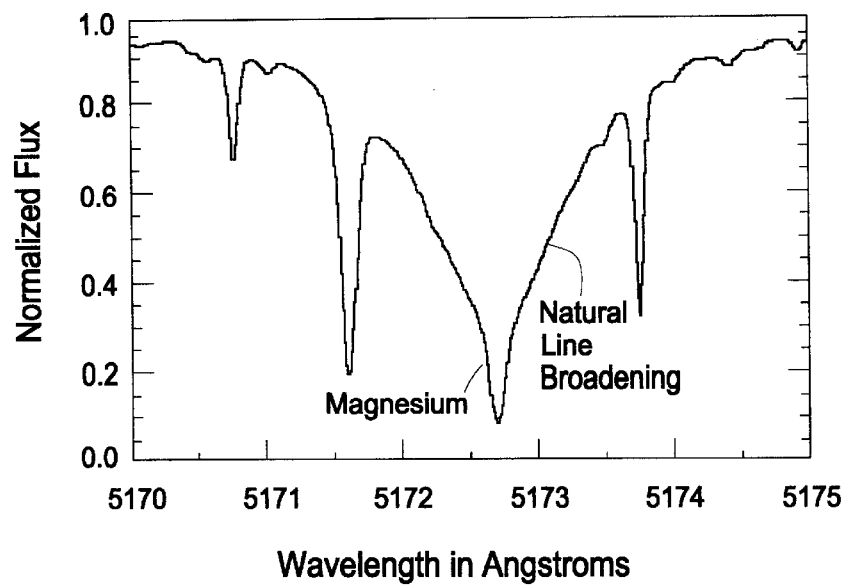
FIG. 3 is an annotated graph with a normalized, arithmetic ordinate.
Figure 4:
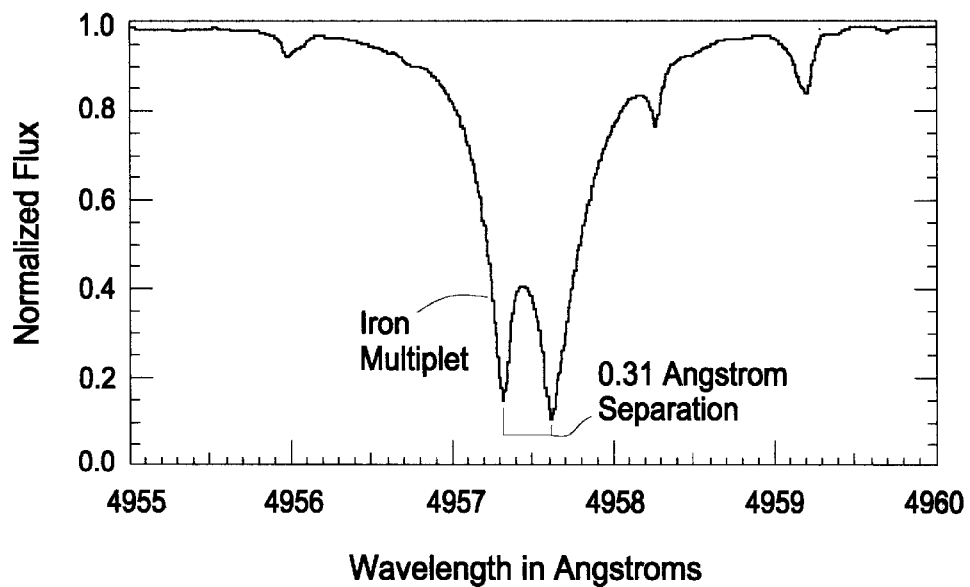
FIG. 4 is an annotated graph with a normalized, arithmetic ordinate.

FIGS. 3 and 4 have already been described. Note that the well-known, sodium D lines, which are separated by some 5.9 Å, lie 20% farther apart than the entire width of FIG. 4.

Figure 5:
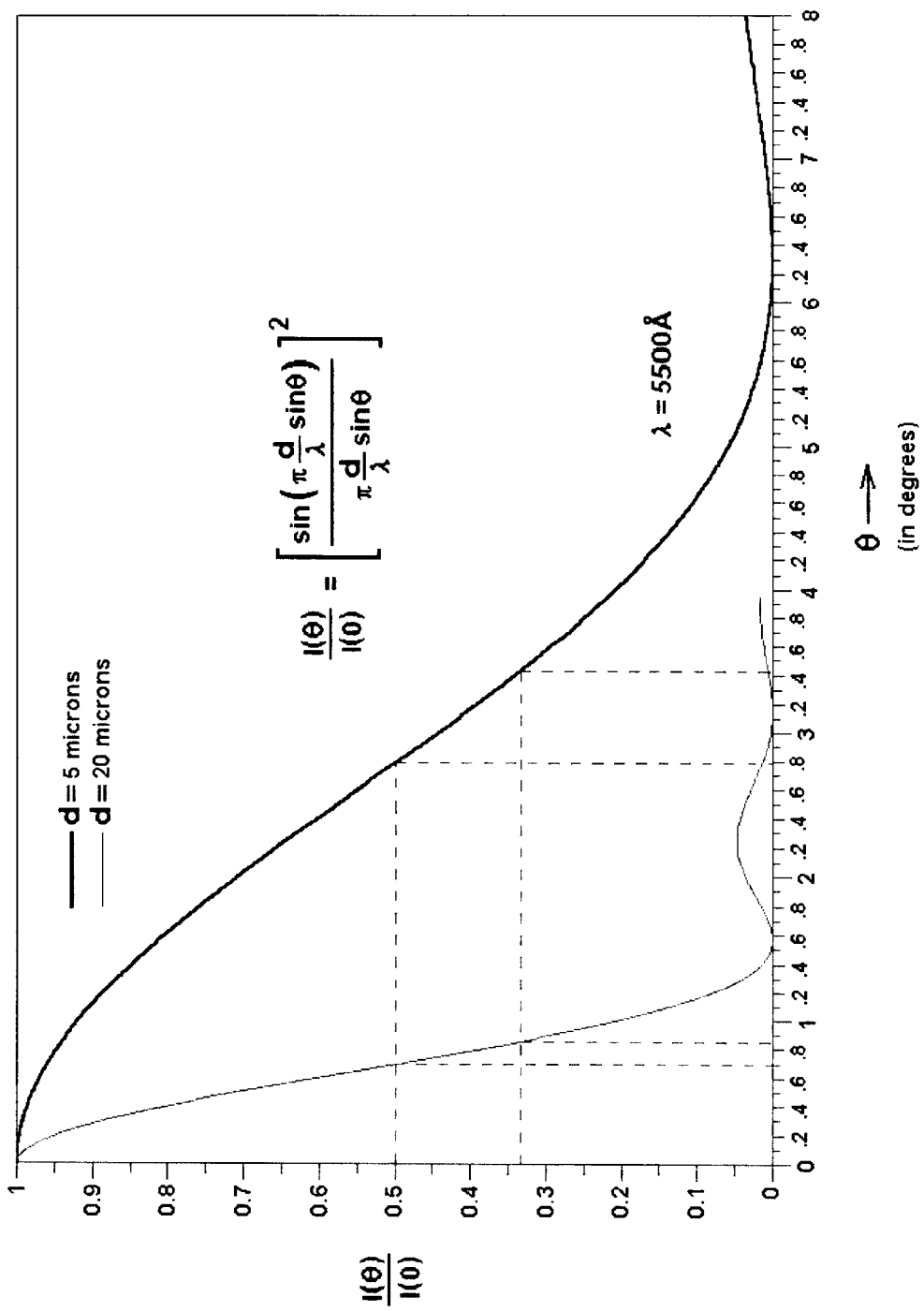
FIG. 5 is an annotated graph with a normalized, arithmetic ordinate.

FIG. 5 is a graph of the expression for the relative intensity for the Fraunhofer diffraction pattern of a slit having width d, for d=5$\mu$ and d=20$\mu$. The angle θ is measured clockwise from the normal to the center of the slit in the direction of propagation. It is well known that the more-general, Fresnel/Kirchhoff analysis reduces to the Fraunhofer analysis for slits having lengths very great compared to their widths (see e.g. Hecht, *Optics*, op. cit., p. 454). In the exemplary embodiment the ratio is 3 mm/5$\mu$, or 600:1.

It will, perhaps, be objected that the Fraunhofer analysis assumes a coherent, plane, wave front incident upon the slit, and that a telescope will reproduce any incoherence present in a light source in the image of that light source. The very obviously incoherent light from an incandescent bulb is not brought uniformly into phase all across the bulb's image merely by that light's passage through a telescope! In answer to this objection, it is necessary to recall that the linear radius $r_{min}$, as distinguished from the angular radius $\theta_{min}$, of the diffraction pattern formed by a telescope, that is, the linear radius of the telescope's Airy disk, depends entirely on the telescope's focal ratio, and not on the diameter of its objective, and is given by:

$$r_{min}=1.22\lambda f/D. \quad (12)$$

As Hecht writes, "the diameter of the Airy disk in the visible is very roughly equal to the f/# of the lens in millionths of a meter [i.e. in microns]" (Hecht, *Optics*, op. cit., p. 420). It is exactly in the center of its Airy disk, however that a telescope does, in fact, render coherent the light incident upon its objective from one, particular direction.

The present invention, in its exemplary embodiment, illuminates a 5$\mu$ entrance slit by means of a telescopic, contrast-optimizing, light-input means having a f/19.4 focal ratio. The Airy disk of such an f/19.4 input-means has a diameter, as we have just seen, that is wider than the slit: specifically, 18.6$\mu$ at the K-line, 26.0$\mu$ at 550 nm, and 31$\mu$ at Hα. The telescopic, input-light device thus forms an Airy disk the diameter of which is not less than 3.7 times the slit-width, and is as much as 6.2 times the slit width. The degree to which the phase of any given wavelength of light is coordinated across the central quarter of an Airy disk is very high. For a discussion of the statistical nature of optical coherence theory see, for example, Hecht, *Optics*, op. cit., Chapter 12. The light falling on the slit will indeed be very substantially coherent across slit's width, and thus the Fraunhofer analysis can indeed be applied (and observed!).

We now can appreciate that, were a 4µ slit to be used in place of a 5µ slit, it would also then be possible to reduce the light-input f/ratio. The necessary, coherence condition for Fraunhofer diffraction would still be met: a 4µ slit permits a smaller Airy disk, that is a lower, input f/ratio. And so it becomes possible to match still-more closely the angle of the cone of light that illuminates the collimating mirror, to match the effective f/ratio of the light-input to the collimator's f/ratio, and thus to illuminate the collimating mirror still more fully, in fact, at many wavelengths, to illuminate it completely. In brief, the narrower the slit the more that diffraction-spreading will broaden the mere, geometric cone-angle of a contrast-optimizing, light-input f/ratio.

This has yet another advantage. We noted above that image intensity is proportional to slit width, all other system parameters held constant. The light lost by using a 4µ slit in place of a 5µ slit can be offset by increasing the diameter of a non-obstructed entrance pupil by a factor of 1.095= $(5/4)^{1/2}$, i.e. by stopping down the telescope less, or maybe not at all. Increasing the entrance pupil by 1.095 reduces in turn the f/ratio from f/19.4 to f/17.7, and, consequently, the Airy disk remains very-much wider than the slit. Furthermore, a 4µ slit subtends an angle of 11.1 arc-seconds at the collimator of the exemplary embodiment, which is still well above the resolving power of that mirror. More importantly, 11.1 arc-seconds is closer to the minimum angular resolution, $(\Delta\theta)_{min}$, of a 20 cm grating (namely to 6.5 arc-seconds at the K line, as we saw above) than the angle subtended by a 5µ slit (13.9 arc-seconds, as we saw above). The 4µ slit thus should produce an improvement in resolution as wavelength is decreased. In this manner, a relatively inexpensive, but useful improvement, over the exemplary embodiment can be achieved. Indeed, still greater performance can be achieved by using mirrors that are just a bit larger, say 24 mm instead of 19 mm, to gain in resolving power, bringing the spectrometer f/ratio down from f/3.9 to f/3.1 with only fairly minor increases in off-axis spherical aberration and instrument size.

Note, in FIG. 5, that a 20µ slit is already too large to broaden light-input usefully. Furthermore, an input f/ratio with an Airy disk wide enough to satisfy the coherence condition for Fraunhofer diffraction for a 20µ slit will have to be around f/40 or more, too high to guarantee optimum contrast (see above) The image will appear faint. Yet 20µ micron slits are decidedly on the narrow side of slits that commonly are used in scanning spectrometers.

Figure 6:
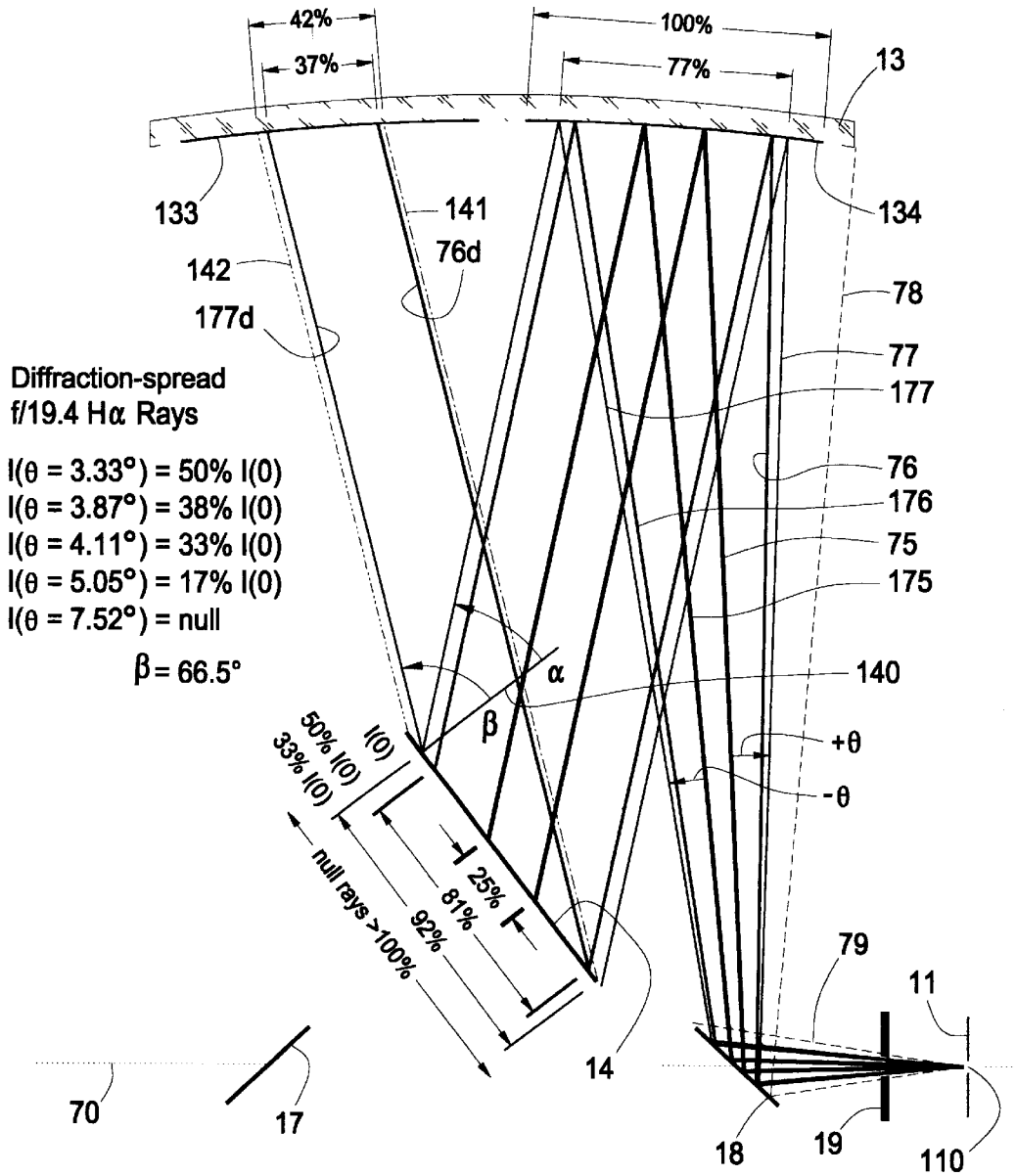
FIG. 6 is an annotated ray diagram

FIG. 6 shows light from a source having an f/19.4 cone-angle after that light's passage through, and Fraunhofer diffraction by, 5µ slit 110 in stainless steel slit-disk 11. Rays 75 and 175 are the geometric traces of the outermost peaks of the diffraction pattern of the input, f/19.4 light-cone. The angles +θ and −θ refer to the abscissa of FIG. 5 and are measured, as there, with respect to the relevant diffraction peak. Rays 76 and 176 are the geometric traces of the 50% intensity points relative to rays 75 and 175, respectively. Rays 77 and 177 are the geometric traces of the 33% intensity points relative to rays 75 and 175, respectively. Rays 78 and 79 are the geometric traces of the first null points in the diffraction patterns for rays 75 and 175, respectively. We note that ray 78 misses the collimating portion 134 of mirror 13 (for simplicity's sake, we'll just say collimating mirror 134, or mirror 134, inasmuch as portion 134 in an Ebert mount is employed as if it were a separate mirror), and that ray 79 misses deflection mirror 18 altogether. This is how stray light enters the system.

It should be noted, for accuracy's sake, that "ray" is but a metaphor for the trace of a distribution point, and that the distribution itself is "in reality" an integrand. The telescopic light-input device may be represented as a symmetric assembly of innumerable, infinitely small elements, dα, each sending a tiny bundle of parallel rays, which we describe, for convenience, as a single "ray", forward at some particular angle. In the present invention, as we have seen, the coherence condition for Fraunhofer diffraction at the slit is met to a high degree. Thus, for each small element dα, and for each wavelength λ emitted from element dα, the function $I_{d\alpha}(\theta,\lambda)$ describes the intensity of the diffraction pattern produced by the light emitted from dα after that light has been diffracted at the slit, where θ is to be measured, as in FIGS. 6 and 7, with respect to our convenient ray for the particular element dα. The total illumination of the collimating mirror 134 will thus just be given by the double integral $\int\int_{d\alpha}(\theta,\lambda)d\alpha d\lambda$ over the symmetric assembly representing our light-input device.

Collimating portion 134 of mirror 13, designed to be fully illuminated by a conventional, f/3.9 input-beam, is more than fully illuminated here, albeit not uniformly. If a still-narrower slit were to be installed, an extra light baffle 19 might well become desirable. Mirror 134, illuminated 100%, is 77% illuminated by light having at least 33% the intensity of the edge of the geometric, f/19.4 cone.

Figure 7:
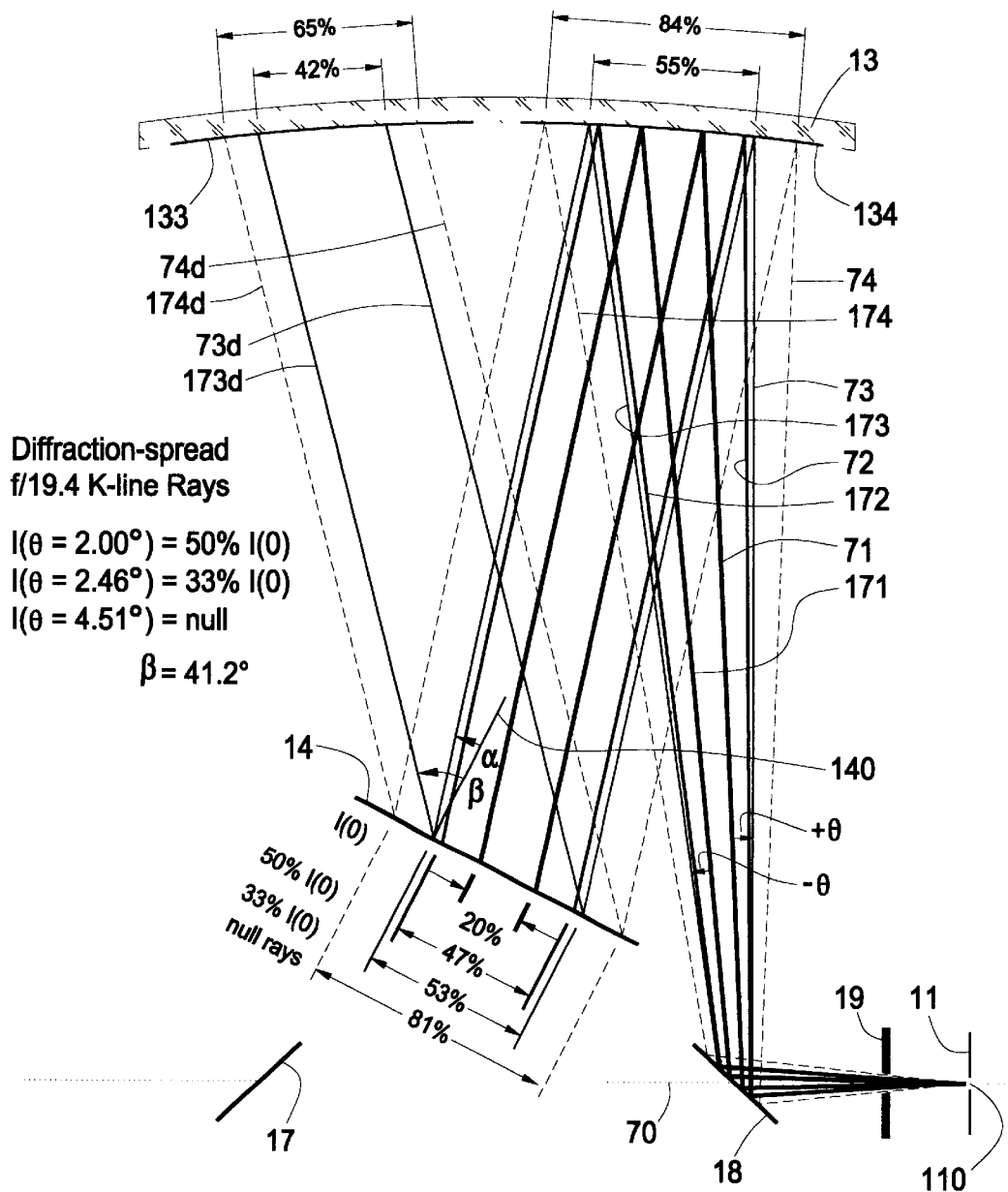
FIG. 7 is an annotated ray diagram

We note that a conventional ray trace for a conventional spectrometer would not distinguish among wavelengths for light that has not yet encountered the spectrometer's grating, but that FIGS. 6 and 7 do make this distinction. That is because appreciable, wavelength dispersion in fact takes place through diffraction at the slit. While this dispersion does not affect the dispersion at the grating, it does make a "white light" rendering of the light inside the spectrometer unrealistic. FIG. 6 is for Hα, i.e. for 656.3 nm.

Grating 14 is fully illuminated, albeit, once again, not uniformly. For the angle of incidence α shown, only light of wavelength 656.3 nm constructively interferes at the angle of diffraction β shown. Ray 76d is the path taken by ray 76 after constructive re-radiation at the grating, and 177d is the same for ray 177. All such rays together proceed parallel to the line connecting grating 14's center with the center of imaging mirror 133. We note that mirror 133 is only 42% illuminated, but that this partial illumination results entirely from the spectrometer's geometry. The nonuniform illumination (37% illuminated by light at least 33% the intensity of the edge of the diffracted, geometric cone) is due to our exploitation of Fraunhofer diffraction at the slit.

Deflection mirror 17 sends the light from mirror 133 to a focus on transverse axis 70, which passes through the center of mirror 18 and slit 110, as well. Correcting the astigmatism and spherical aberration that render the focus on axis 70 imperfect and, indeed, not entirely on axis 70, is what makes improving the Ebert design significantly more expensive and the result bulkier.

FIG. 7 is analogous to FIG. 6, except that it is for the K-line, at 393.4 nm. The numbering follows the same logic. Thus rays 71 and 171 are the geometric traces of the outermost peaks of the diffraction pattern. Rays 72 and 172 are the traces of the 50% intensity points relative to rays 71 and 171, respectively, and rays 73 and 173 are the traces of the 33% intensity points relative to rays 71 and 171, respectively. Rays 74 and 174 are the traces of the first null points in the diffraction patterns for rays 71 and 171, respectively. Note that neither mirror 134 nor grating 14 nor mirror 133 are fully illuminated, but that the lack this time of full illumination is due to insufficient diffraction spreading by the 5µ slit at the rather short, K-line wavelength. In the far, visible violet, a 4µ slit would notably improve the exemplary embodiment.

Figure 8:
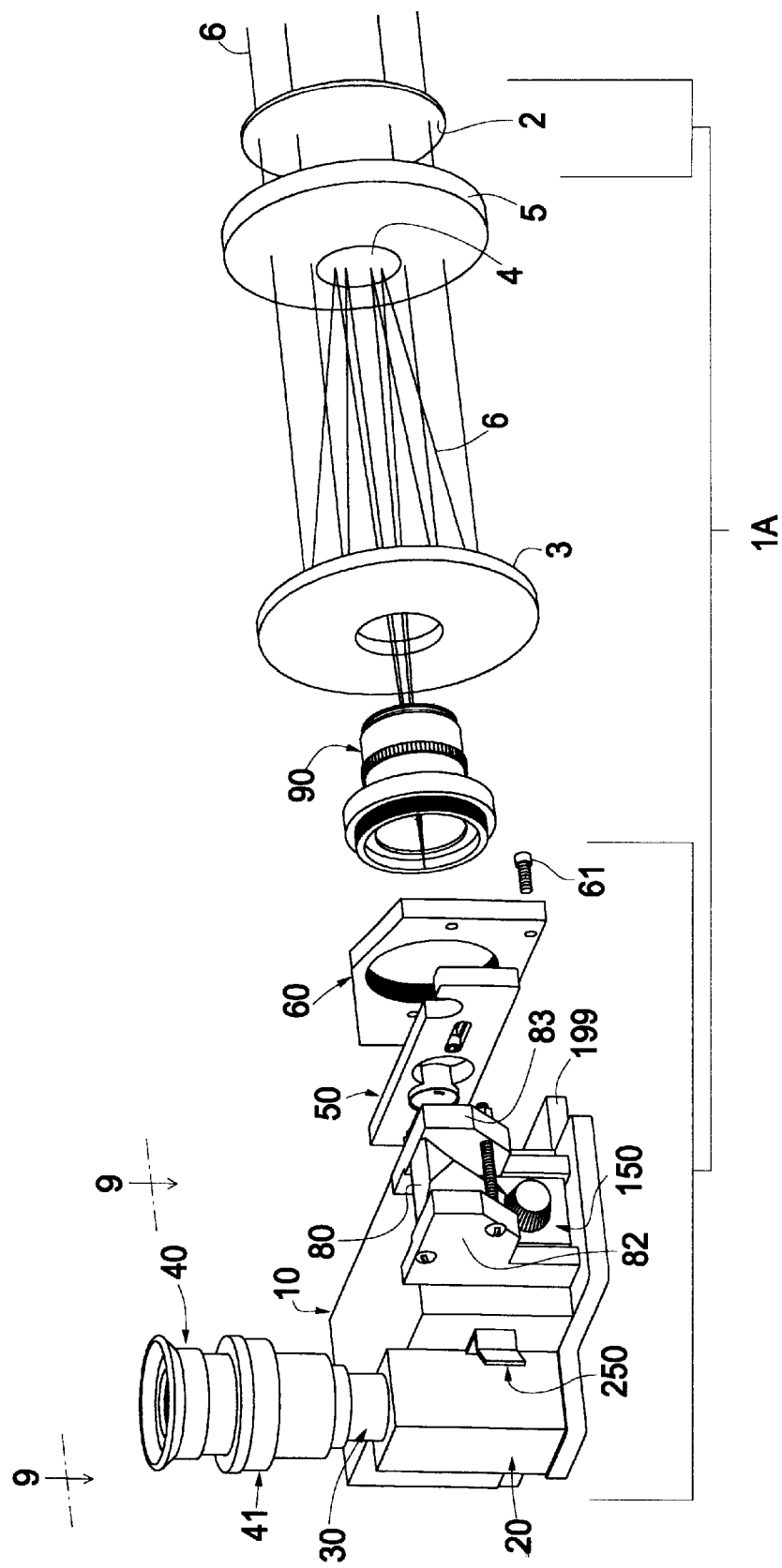
FIG. 8 is a perspective view of the exemplary embodiment of the present invention, partially exploded along its transverse axis, and a coaxial, light-input device.

FIG. 8 shows the exemplary embodiment 1A of the present invention with light being input by a Maksutov-cassegrain, Questar telescope having primary mirror 3, secondary mirror 4, and meniscus lens 5. Rays 6, parallel to the telescope's optical axis, pass through heat absorbing filter 2, by preference a Schott KG-5 filter, before entering the telescope. Filter 2 is shown to be smaller in diameter than meniscus 5, and in fact is the aperture stop creating the f/19.4 focal ratio used in the prototype. Filter 2 is held in an opaque, lens-cap type mounting (not shown).

Coupling 90 screws into a port at the rear of the telescope and also into front plate 60 of the spectrometer. Plate 60 in turn attaches to base plate 199 by means of screws 61, one of which is shown. Slide 50 carries the condensing lens and is described in detail below. Spectrometer 10 attaches from underneath to plate 199 with machine screws (not shown). Wavelength-calibrated dial 150 is visible between prism holders 82 and 83, which hold amici prism 80 and which also bolt to plate 199 from underneath. Optical tower 20 bolts to plate 199 from underneath, as well. Reticle slide 250 is captured between tower 20 and spectrometer 10. Above tower 20 is relay housing 30 to which is attached helical focuser 41 for eyepiece 40.

Figure 9:
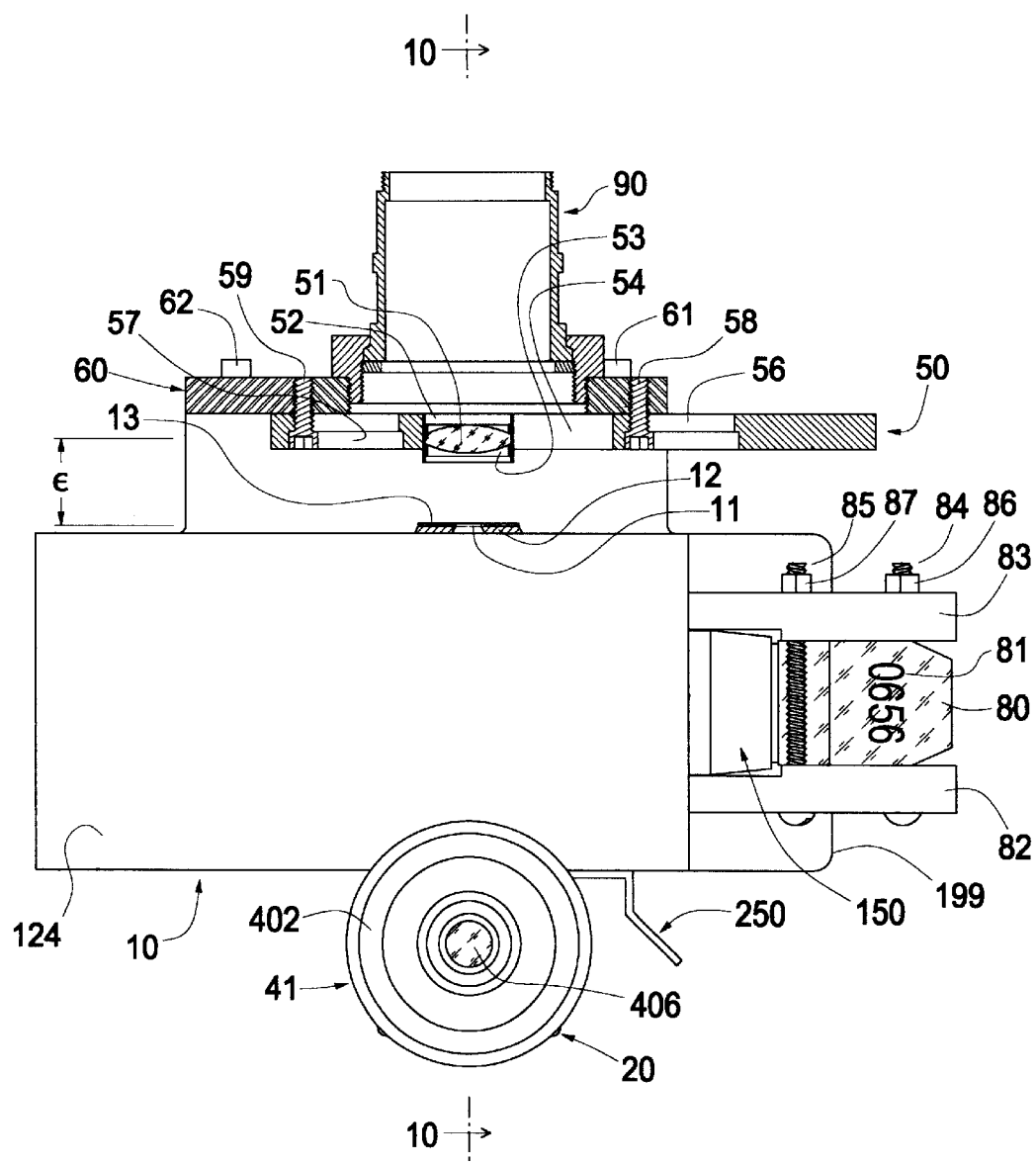
FIG. 9 is a top plan view in partial cross-section of a portion of FIG. 8, taken in the direction of the arrows 9—9 of FIG. 8.

FIG. 9 shows front plate 60 securely bolted to plate 199 with screws 61 and 62. Slide 50 is bolted to front plate 60 with cap-screws 58 and 59, which may be thread-cemented into plate 60, but that freely ride in mortised slots 56 and 57, respectively, of slide 50. Slide 50 has aperture 54, better seen in FIGS. 11 and 12, next to which it carries thin-walled tube 52, in which condenser lens 51 rides, held in place retaining rings 53. Lens 51 might also be cemented into tube 52.

Lens 51 is by preference either a singlet, as shown, made of quartz ($SiO_2$), or else an air-spaced doublet. Since lens 51's sole function is to amplify light in narrow wavelength ranges in the far, visual violet and far red, but principally in the violet, the superior transmission of quartz over glass at short wavelengths recommends it. Air-spaced doublets lack short-wavelength-absorbing, optical cement.

The distance $\epsilon$ is the perpendicular distance from the center of lens 51 at its principal plane to the center of slit 110 in slit disk 11.

Screws 84 and 85 with mating nuts 86 and 87 allow holders 82 and 83 to grasp amici prism 80 frictionally between them. Number 81, which is just the readout of calibrated dial 150 readably reflected through 90 degrees can been seen in prism 80. A person observing through lens 406 of eyepiece 41 can glance easily (not even 40 degrees and not in the direction of the sun) to his or her right to ascertain the wavelength at the center of the field. Rubber eye guard 402 minimizes stray light.

Spectrometer 10 has outer sheet-metal housing 124. Visible in cross-section is slit disk 11 sandwiched between holders 12 and 13. These last three items form the slit assembly which may be attached with screws or banana plugs (not shown) to spectrometer 10.

Figure 10:
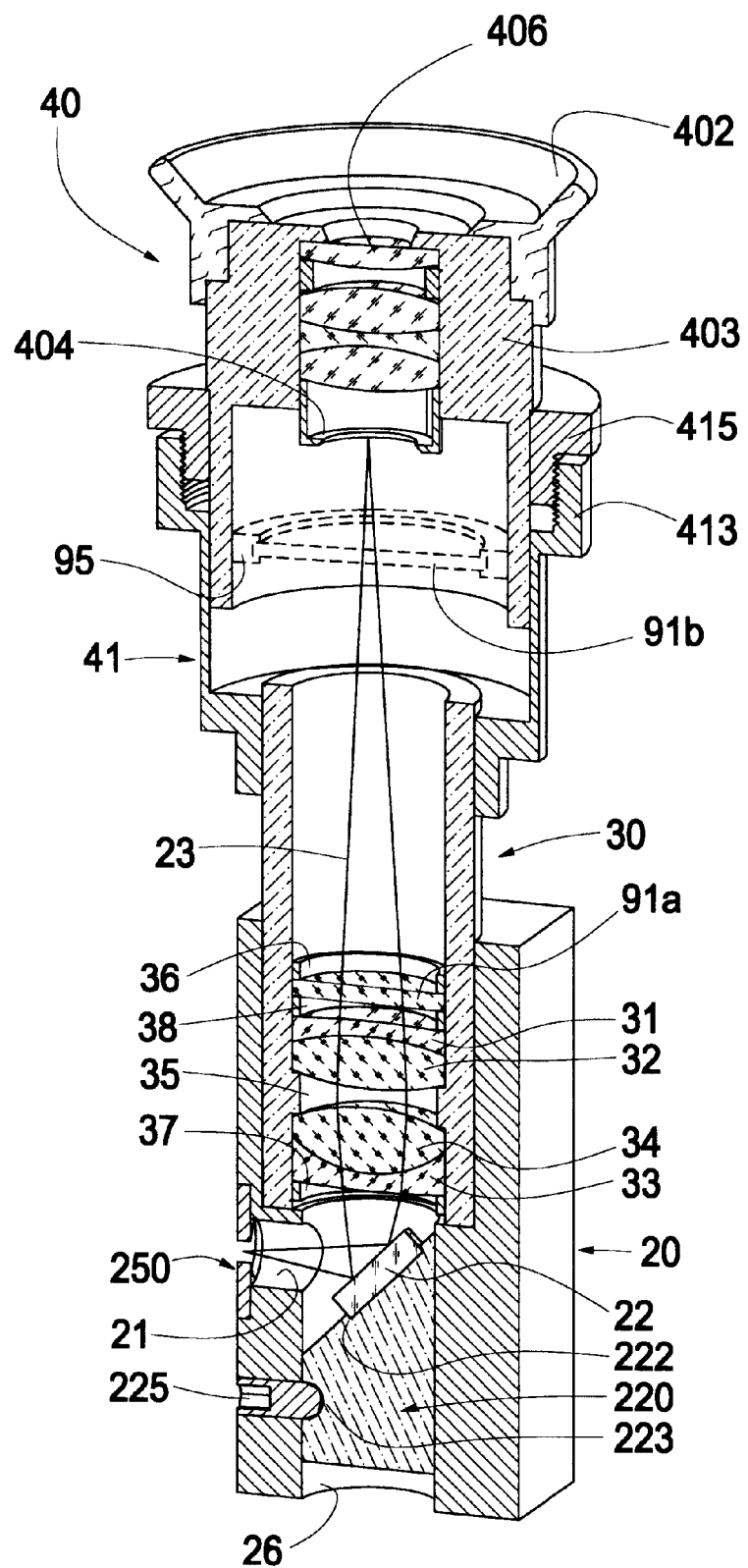
FIG. 10 is a cross-sectional view of four numbered elements of FIG. 8 taken in the direction of the arrows 10—10 of FIG. 9.

FIG. 10 shows optical tower 20 connected to relay housing 30 which in turn is connected to helical focuser 41. These connections are easily and adjustably effected either by threading or by small set screws, not shown. Inside bore 26 of tower 20 is plug 220 carrying small, high-quality, first-surface mirror 22, shown cemented into shallow, inlay pocket 222, which keeps mirror 22 in constant position. To keep plug 220 in constant position, and thus to maintain the surface of mirror 22 in constant vertical position, set-screw 225 is threaded through tower 20 and mates with dimple 223 in plug 220. Mirror 22 direct rays 23 along the axis of tower 20 from their first focus to their second focus at the center of field stop 404 of eyepiece 40. The first focus is just the location of the center of the spectrum-image produced by mirror 133 after its redirection, inside spectrometer 10, by mirror 17. Rays 23 enter tower 20 through cylindrical bore 21. Shown covering a small portion of bore 21 is slide 250.

Relay housing 30 contains a first achromat formed by positive lens 34 and negative lens 33 and a second achromat of twice the focal length formed of positive lens 32 and negative lens 31. These two achromats are spaced apart by spacer 35 and are held in housing 30 by retaining rings 37 and 38, in the usual manner, thus forming a relay with finite/finite, 1:2 conjugate points. The nearer conjugate point lies at the paraxial focus of the spectrum-image formed by mirror 133 and redirected out the side of spectrometer 10. The spectrum is now imaged a second time at the relay's second conjugate point, at the center of field stop 404, with a consequent doubling of its linear extent. Just following the relay is Schott GG-385, UV-filter 91a held in place by retaining ring 36. An alternate position for this filter is 91b inside eyepiece 40. However, the filter will need to be larger there and have threaded collar 95. Collar 95 mates with the internal threads (not shown) found in most eyepieces. 91a is the less-expensive position.

Eyepiece 40 has barrel 403 which fits snugly into, or, as in the Questar, screws into helical focuser 41. As ring 415 is turned in mated, threaded piece 413, eyepiece 40 is raised and lowered. This is an important adjustment, because the Ebert grating mount used in the exemplary embodiment does not have the same, paraxial, focal plane at all wavelengths. The linear adjustment needed is slight but the image-effect is quite noticeable.

FIG. 11 shows slide 50 mounted to front plate 60 with hex-head cap-screws 58 and 59. Similar cap-screws 61 and 62 (see FIG. 9) pass through holes 63 and 65 in plate 60, bolting it to base plate 199 (FIG. 8). Hole 64 functions likewise. Threaded aperture 62 in plate 60 mates with coupling 90 (see FIG. 8).

Slide 50 contains two, parallel, cylindrical apertures 54 and 55 whose axes are closer than the sum of their diameters. Aperture 55 carries tube 52, which in turn carries condensing lens 51. Finger nook 550 allows slide 50 to be moved left and right, with slots 56 and 57 guiding and limiting slide 50's motion by means of their respective contact with screws 58 and 59.

FIG. 12 shows slide 50 moved farthest right. It is apparent that, when slide 50 is positioned as in FIG. 11, farthest to the left, aperture 54 is concentric with aperture 62 in front plate 60. Aperture 54 is wide enough to allow rays 6 (see FIG. 8) converging from the telescopic light-input device to pass unimpeded to a focus though slide 50. When slide 50 is moved farthest right, condenser 51 is positioned both concentrically with respect to converging rays 6 and coaxially with respect to their chief ray, thus causing them uniformly to converge still-more rapidly, producing a smaller, much more intense image of the sun on spectrometer slit 110.

Recall from FIG. 9 that $\epsilon$ is the distance from the center of lens's 51's principal plane to the center of slit 110. Let $F_1$ equal the focal length of the telescopic, light-input device and let $F_2$ equal the focal length of lens 51. Let $\chi > 1$ equal the desired, light-intensity, amplification factor. (In the exemplary embodiment, $\chi$ was ten, but it might be less or, if a suitable short-focal length lens can be found, somewhat more.) For simplicity's sake, we represent the telescopic, light-input device by a thin lens having focal length $F_1$ and lens 51 by a thin lens having focal length $F_2$. We imagine lens 51 placed at a distance $\Delta$ from the objective of the telescopic, light-input device. Using the thin-lens approximation, we ask what must $\epsilon$ be given $y$, for an object, such as the sun, located effectively at $\infty$?

The virtual object of lens 51 is just the image formed by the telescopic, light-input device. Lens 51 is a distance $F_1 - \Delta$ from this virtual object. Letting $i_2$ be the distance from lens 51 to the image it forms of the virtual object, we can write:

$$1/F_2 = \{1/[-(F_1 - \Delta)]\} + [1/i_2], \tag{13}$$

where the minus sign before $(F_1 - \Delta)$ is necessary because the object of lens 51 is virtual, rather than real. Now, let the virtual object have a height $h_1$ and the real image formed by both lenses a height $h_2$. A ray passing from the top of the virtual object through the center of lens 51 must also pass through the top of the real image, in virtue of the thin-lens approximation. Invoking similar triangles we see that the distance of lens 51 from its virtual object is to the virtual object's height as the distance of lens 51 is to the real image height, or:

$$h_1/h_2 = (F_1 - \Delta)/i_2. \tag{14}$$

But the ratio $h_1/h_2 = y^{1/2}$, because the amplification ratio $y$ is just the ratio of the image areas, which is proportional to the squares of the image heights. Thus $i_2 = (F_1 - \Delta)/y^{1/2}$. We can now substitute into equation (13) and solve for $\Delta$. We find, $$\Delta = F_1 - F_2(y^{1/2} - 1). \tag{15}$$

Let p equal the distance between the principal plane of lens 51 and the focus $F_1$, namely $(F_1 - \Delta)$. This is the distance lens 51 must be moved inside the original focus of the telescopic light-input means so that an image will be formed by it on the slit. We find from (15) that, $$p = (F_1 - \Delta) = F_2(y^{1/2} - 1), \tag{16}$$

shown with radical notation in FIG. 13. Thus, to a first approximation, the movement of lens 51 inside the original focus depends only on the condensing lens and amplification ratio, not on the focal length of the telescopic, light-input device.

$\epsilon$ is just the image distance $i_2$. Substituting $(F_1 - \Delta)$ from equation (16) into equation (13), and replacing $i_2$ with $\epsilon$, and solving, we find that, $$\epsilon = F_2[(y^{1/2} - 1)/y^{1/2}], \tag{17}$$

shown with radical notation in FIG. 14. Thus, to a first approximation, the distance $\epsilon$ in FIG. 9 depends only on the condensing lens's focal length and the amplification ratio, not on the focal length of the telescopic light-input device. Since $y > 1$ we also see that $\epsilon < F_2$.

In the concrete case of FIG. 9, we can use equation (17) to find a value for $F_2$, given a ten-time amplification ratio and a distance of 15 mm from the slit to the condensing lens's principal plane. We find that $$F_2 = 15[10^{1/2}/(10^{1/2} - 1)] = 21.9 \text{ mm}.$$

The distance p that lens 51 must be placed inside the original focal point is just $$p = 21.9(10^{1/2} - 1) = 47.3 \text{ mm},$$

or well within the range of most commercial, rack-and-pinon focusers. For a two-mirror telescope, such as the Questar, where focal length is variable and rear-mounted accessories are fixed in place, the focal point will simply be moved back until, with the condensing lens placed on the optical axis via slide 50, an intensified solar image is formed on the slit. Since the virtual object of the condenser will have been slightly increased in diameter over its diameter prior to this refocusing, the degree of light amplification will be somewhat less than in the case of a fixed-focus telescope. The thin-lens approximation, however, will remain entirely valid with respect to the new, slightly longer focal length.

It is important to note that, when condensing lens 51 is moved onto the optical axis of the telescopic light-input means, it will substantially decrease the light-input means's effective focal length, hence, its focal ratio, which in turn may invalidate the coherence condition assumed in the analysis of single-slit, Fraunhofer diffraction. The Airy disk with the condenser in place may even conceivably become narrower than the silt width. This is not a problem. Recall that the high f/ratio of the telescopic light-input device was in part necessary to optimize visual contrast over the eye's dynamic range. Where the condenser becomes useful, however, is in exactly those regions of the spectrum where the eye's unassisted dynamic range is no longer effective in maintaining useful contrast, anyway. The worst that can happen by introducing the condenser is that there will be very little diffraction-spreading of the light illuminating the collimating mirror, that, instead, there will be simply the usual, geometrically determined, light cone. But this cone will now have become much closer in numerical aperture to the collimator's numerical aperture, so that the collimator will remain well illuminated, possibly more fully than before, which in turn helps to compensate further the eye's reduced sensitivity, and all without trading off spectrometer resolution for increased image brightness.

Above, toward the end of the Brief Summary of the Invention, we discussed what we called the UV spill arising from the amplified, second-order spectrum, as well as the prudential need to attenuate it. Let us state now what the least amount of attenuation must be. Clearly, which is to say prudentially, the attenuation factor $\sigma$ will have to be much smaller, numerically, than the inverse of the amplification ratio $y$. The amplification ratio $y$, however, is just the ratio of the image area produced by the original effective focal length to the image area produced by the new effective focal length. This ratio, in turn, is just the square of the ratio of these two focal lengths. Condenser 51 changes the original, effective focal length $F_1$ to a new effective focal length $F_1'$. Thus we can write for the attenuation factor $\sigma$:

$$\sigma \ll 1/y = [F_1'/F_1]^2. \tag{18}$$

For a conventional lens of focal length f and diameter d, the numerical aperture is just one half the reciprocal of the focal ratio, or $$na = 1/[2(f/d)]. \tag{19}$$

We will assume that condenser 51 does not vignette the telescopic light-input means, so that D, the diameter of the entrance pupil, remains constant. Substituting first $F_1$ and then $F_1'$ into (19) for f, and constant D for d and substituting into (18), we find for the attenuation factor $\sigma$:

$$\sigma \ll [na_{original}/na_{new}]^2. \tag{20}$$

Figure 15:
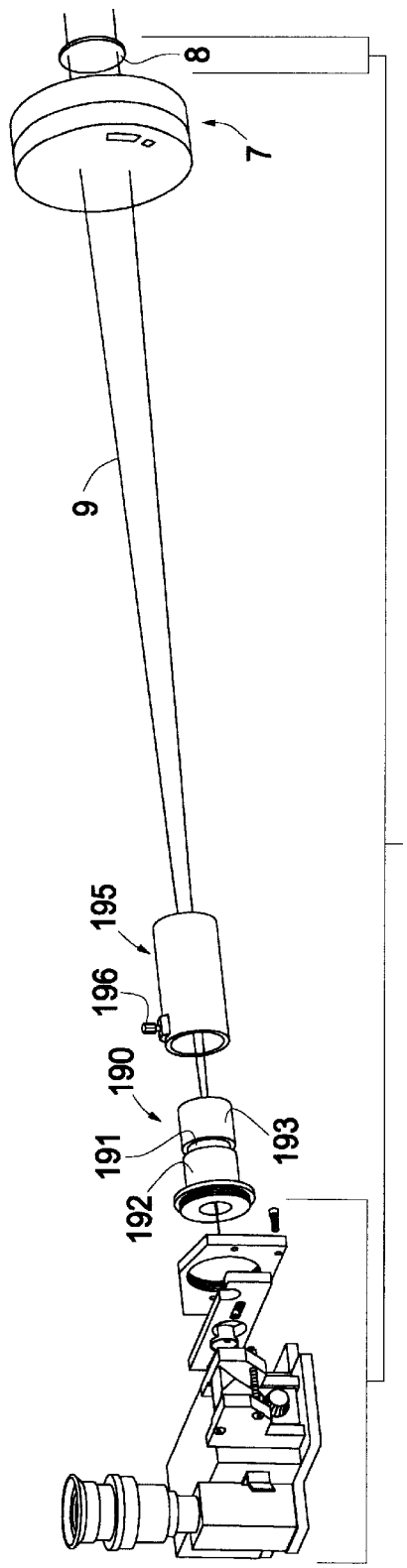
FIG. 15 is a perspective view of a second embodiment of the present invention, partially exploded along its transverse axis, and a coaxial, light-input device, different from that shown in FIG. 8.

FIG. 15 shows variant 1B of exemplary embodiment 1A with light being input by a refracting telescope. Coupling 190 threads into plate 50 and slides into drawtube 195, which is moved by a rack-and-pinion focuser (not shown). Drawtube 195 has finger screw 196 that may be lowered into annular slot 191 between portions 192 and 193 of coupling 190 after 190 has been slid into 195. This prevents variant 1B from falling out of drawtube 190 when the sun is near the zenith, and further lets 1B be rotated to orient the slit.

The telescopic light-input means in FIG. 15 has f/7, achromatic objective 7, which sends rays 9 to a focus on the slit of the spectrometer. Objective 7's low f/ratio means that heat absorbing filter 8 must have a much smaller diameter to create an contrast-optimizing focal ratio, here f/19.4. Filter 8 is mounted in an opaque, lens-cap-like device (not shown). A negative lens could be used to produce a long, effective focal ratio instead, resulting in a larger solar image and allowing filter 8 to have the same diameter as objective 7.

Figure 16:
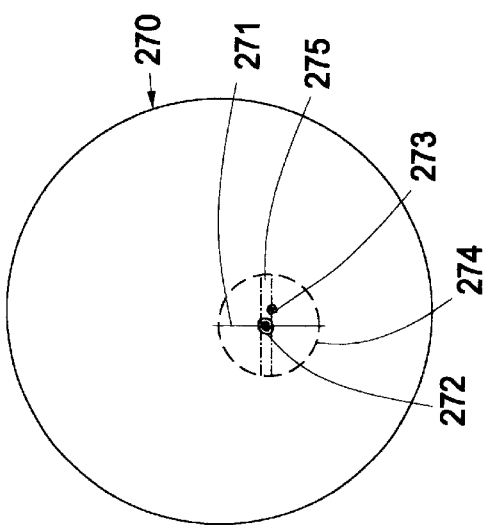
FIG. 16 is a schematic view of the sun in white light with an optical field of view schematically superimposed thereupon.

FIG. 16 shows sunspots 272 and 273, the larger of which is drawn to be about 1500 millionths the area of solar disk 270. Such a sunspot could well develop a magnetic field of 3500 gauss (see above), strong enough to generate Zeeman splitting visible with the present invention. Line 271 represents the length of slit 110, given that solar disk 270 has been formed by a 1210 mm focal length telescope, such as a Questar. Note that a 5$\mu$ slit is at least 5 times narrower than the line used in FIG. 16 to represent slit 110. Dashed circle 274 represents the apparent field of view through eyepiece 40. Only the middle 2.4 mm of 3 mm slit 110 actually contribute to the image viewed in the exemplary embodiment. Strip 275, between the dash-dot lines and through the center of field 274 is the where, for an f/3.9 spectrometer (see Fastie, op. cit.), theoretical resolution will always remain indistinguishable, due to instrumental broadening, from actual resolution.

FIG. 17 shows the construction, considerably simplified, of Ebert spectrometer 10. To bottom plate 121 with mounting hole 128 are connected front plate and end plate 122 and 123, respectively, and carriage plate 125 having milled trough 126. Cover 124, shown broken away, encloses the whole. Calibrated dial 150 has knob 151 and window 140, in which is displayed the wavelength in nm at the center of the field of eyepiece 40, within some small margin or error. Mirror 13 is mounted to plate 123. Stray light mask 130 has apertures 131 and 132, which respectively define collimating mirror 134 and imaging mirror 133 (recall FIGS. 6 and 7). Deflecting mirrors 17 and 18 are held by greatly simplified structure 16. Grating 14 is mounted in holder 161 so that its ruled face contains the shared axis of rotation of rods 162 and 163, which rotate in structure 16. Extending from 162 is sine-bar 164, which ends in sphere 166, which in turn rides snugly inside a cylindrical bore in arm 166. (For a treatment of sine-bars, see the Richardson *Handbook*, op. cit.) Turning knob 151 turns shaft 152, which in turn moves toothed belt 153, thus transmitting the rotation of knob 151 to gear 154 and, finally, to threaded shaft 156, journaled at its far end in socket 127. Thus arm 166 is caused to move along trough 126, in turn causing grating 14 to rotate. Grating 14's rotation is constrained at the far, visible, red by jam nuts 158a and 158b and at the far, visible, violet by jam nuts 157a and 157b. To insure that a user can only move the jam nuts deliberately, especially toward the violet, a daub of paint 159 has been applied to jam nuts 157a and 157b. Slit disk 11 is just visible in the center of slit-holder plate 12.

FIG. 18 shows exemplary embodiment 1A of the present invention as it would be seen by an end-user.

FIG. 19 is a detail of FIG. 18 showing solar image 270 projected onto the slit assembly formed by slit disk 11 as sandwiched between slit-holder plates 12 and 13. Note that solar lag image 270 is not centered on the slit. Perhaps the user has found an interesting sunspot, as shown in FIG. 16. If no heat absorbing filter were used, the slit assembly would differentially heat fairly rapidly.

Figure 20:
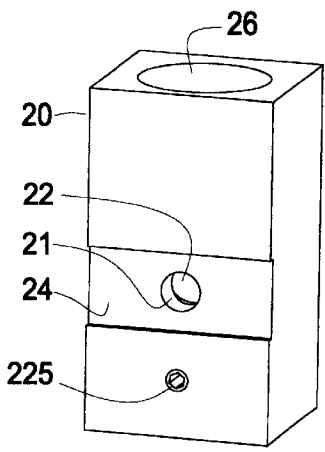
FIG. 20 is a perspective view of one of the numbered elements of FIG. 8 rotated 180 degrees with respect to the vertical axis of FIG. 8.

FIG. 20 shows optical tower 20 with cylindrical bore 26, off center as in FIG. 10 to gain extra metal in which to thread mounting screws from below (not shown), milled slot 24, ray-path bore 21, and hex-head set screw 225. First surface mirror 22 is visible through bore 21.

Figure 21:
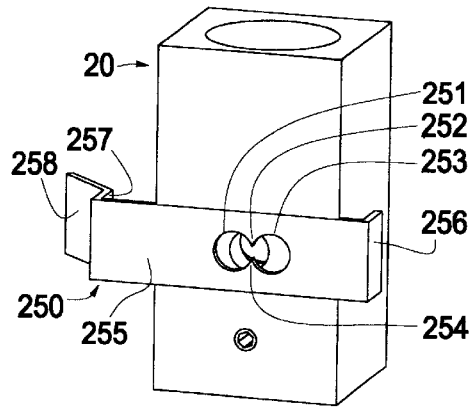
FIG. 21 is the element shown in FIG. 20 with an additional and adjacent, numbered element of FIG. 8 likewise rotated 180 degrees with respect to the vertical axis of FIG. 8.

FIG. 21 shows reticle slide 250 seated in slot 24. Slide 250, preferably made of thin, sheet stainless steel, has long midsection 255, end segment 256 at a right angle, opposite end segment 257 also at a right angle to 255, and oblique segment 258 extending from 257. Slot 24 is very slightly deeper than the thickness of slide 250, allowing the slide to move freely in slot 24 when tower 20 is mounted adjacent to spectrometer 10. Midsection 255 has two, equal, circular apertures 251 and 253, the midpoints of which are separated by slightly less than the apertures' shared diameter, giving rise to pointed, top and bottom cusps 252 and 254.

Figure 22:
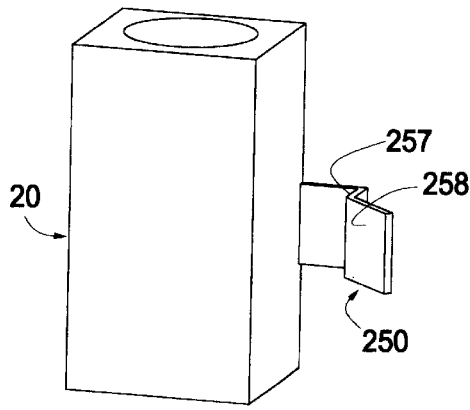
FIG. 22 is identical to FIG. 21, except that the figure has been rotated 180 degrees about its vertical axis.

FIG. 22 shows the little grip formed by oblique section 258. When pinched between thumb and forefinger, slide 250 may be easily moved in slot 24. Segments 256 and 257 limit this movement right and left when they encounter tower 20. Slide 250 lies very close, being very thin, to the paraxial focal plane of spectrometer 10.

Figure 23:
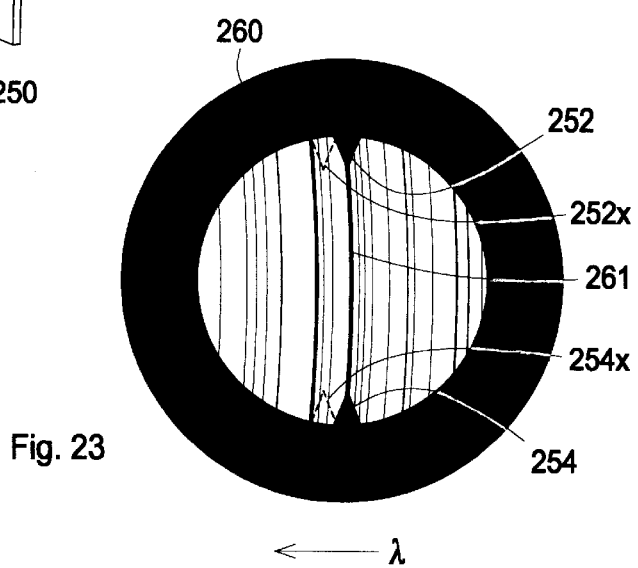
FIG. 23 is a representative, schematic view through the eyepiece of the present invention.

FIG. 23 shows a schematic view through eyepiece 40. Black annulus 260 represents the dark interior of the eyepiece around its bright field of view. With the FIG. 23 held at normal reading distance, the inside diameter of annulus 260 subtends an angle of about 7 degrees. The wavelength distance across the field is about 5 nm, or 50 Å. When actually seen, however, the field seems about five to six times wider, depending on eyepiece design. Most eyepieces have apparent fields of view of 35 degrees or more.

Seen projected onto the image of the spectrum are cusps 252 and 254 of slide 250. Whoever is viewing has moved the cusps from positions 252x and 254x in order to point out spectral line 261. The optical relay permits the reticle formed by cusps 252 and 254 to be inserted at the paraxial focus of spectrometer 10 and then to be imaged along with the re-imaged spectrum. This is considerably easier than trying to build a movable reticle into a short focus eyepiece.

Line 261 is gently curved, its ends closer to the red than to the violet.

To focus the sun onto the slit, the solar image is first made to cover half the slit, that is, half the field. Focus is achieved when the edge of the spectrum becomes sharp. This is quite apparent. If a prominence should happen to lie on the slit, H$\alpha$ will show in emission beyond the solar limb.

The present invention, although principally intended for visual, solar observation, can be employed to advantage in other, light-analytical settings in which the source of light is intense: an explosion; arc, spark, or laser volatilization of compounds; high-temperature industrial processes. Where there is a need to keep a safe distance, hence to use a telescopic light-input device, and where high dispersion at low cost is desirable, the present invention offers significant advantages over standard instrumentation.

Inasmuch as modifications and alterations apparent to one skilled in the art may be made to the herein described embodiments of the present invention without departing from the scope and spirit thereof, it is intended that all matter contained herein be interpreted in an illustrative, and not in a limiting, sense with respect to the invention claimed in the following claims and equivalents thereto.

I claim:

1. A spectrometer and light-input means, said light-input means having a first numerical aperture, said spectrometer comprising a split and a collimating mirror, said slit having a width, said collimating mirror having a second numerical aperture, said light-input means illuminating said slit substantially coherently across said width,
and said second numerical aperture is greater than said first numerical aperture.

2. A spectrometer and a light-input means as in claim 1 in which said spectrometer forms an image, and said spectrometer further comprises an eyepiece through which a person can view image.

3. A spectrometer as in claim 2 in which said collimating mirror has a focal length less than 100 mm.

4. A spectrometer as in claim 1, said spectrometer further comprising an optical relay having finite/finite conjugate points, the first of said conjugate points coinciding with said image formed by said spectrometer, and the second of said conjugate points coincides with an image of said image formed by said spectrometer.

5. A spectrometer as in claim 4 in which said optical relay comprises a first, positive, achromatic lens having a first focal length, and a second, positive, achromatic lens having a second focal length, and in which the ratio of said second focal length to said first focal length is greater than 1.

6. A spectrometer and a light-input means as in claim 1, in which said light-input means is a telescope.

7. A spectrometer and a light-input means as in claim 1, said spectrometer further comprising a heat-absorbing filter, and said heat-absorbing filter is the entrance pupil of said light-input means.

8. A spectrometer and a light-input means as in claim 7 in which said heat-absorbing filter is made of a filter glass having transmission characteristics substantially the same as a filter glass chosen from the Schott KG-1 to KG-5 series.

9. A spectrometer and a light-input means as in claim 1, said spectrometer further comprising a movable condenser having a first position and a second position, said condenser in said first position having no effect upon said first numerical aperture, but said condenser in said second position substantially increases said first numerical aperture.

10. A spectrometer as in claim 9 in which said condenser is made of silicon dioxide.

11. A spectrometer as in claim 9, said spectrometer further comprising a diffraction grating, an eyepiece, and a long-pass filter, said long-pass filter reducing the intensity of the ultraviolet radiation of the second-order spectrum formed by said diffraction grating that overlaps the first-order spectrum formed by said diffraction grating by a factor at least an order of magnitude less than the square of the ratio of said first numerical aperture to said increased, first numerical aperture.

12. A spectrometer as in claim 11 in which said long-pass filter is a Schott GG-385 UV-absorbing filter.

13. A spectrometer as in claim 11 in which said long-pass filter is a Corion LG-370 UV-absorbing filter.

14. A spectrometer and a light-input means as in claim 1, said spectrometer being adapted for visual use, and in which contrast has been optimized in the wavelength interval between 550 and 560 nm.

15. A spectrometer and a light-input means as in claim 14, in which the numerical aperture of said collimating mirror is 0.128 and the numerical aperture of said light-input means is greater than 0.0258 and less than 0.0298, plus or minus 20%.

16. A spectrometer as in claim 1, said spectrometer further comprising a movable reticle.

17. A spectrometer as in claim 4, said spectrometer further comprising a movable reticle, and said reticle can be moved to coincide with said first conjugate point.

18. A spectrometer as in claim 17, said movable reticle further comprising two points, said points being spaced apart, and said points are superimposed upon said image of said image formed by said spectrometer.

19. A spectrometer as in claim 1, said spectrometer being adapted for visual use, said spectrometer further comprising an eyepiece and a calibrated dial adapted to indicate wavelength, and said wavelength indicated by said calibrated dial is visible within a 45 degree cone centered on the axis of said eyepiece.

20. A spectrometer as in claim 19, said spectrometer further comprising an amici roof prism.

21. A spectrometer and a light-input means as in claim 6, in which said light-input means is a telescope, and said telescope forms an Airy disk greater in linear diameter than said width of said slit by a factor of at least four.

22. A spectrometer and a light-put means as in claim 2 in which absorption lines in the solar spectrum spaced apart by less than 0.32 nm are perceived to be distinctly separated when viewed by said person through said eyepiece.

* * * * *